United States Patent
Karlsson et al.

(10) Patent No.: US 9,483,054 B2
(45) Date of Patent: *Nov. 1, 2016

(54) SYSTEMS AND METHODS FOR USING MULTIPLE HYPOTHESES IN A VISUAL SIMULTANEOUS LOCALIZATION AND MAPPING SYSTEM

(71) Applicant: iRobot Corporation, Bedford, MA (US)

(72) Inventors: L. Niklas Karlsson, Pasadena, CA (US); Paolo Pirjanian, Glendale, CA (US); Luis Filipe Domingues Goncalves, Pasadena, CA (US); Enrico Di Bernardo, Padova (IT)

(73) Assignee: iRobot Corporation, Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,162

(22) Filed: Jul. 10, 2015

(65) Prior Publication Data
US 2015/0316930 A1     Nov. 5, 2015

Related U.S. Application Data

(60) Continuation of application No. 14/271,260, filed on May 6, 2014, now Pat. No. 9,110,470, which is a continuation of application No. 13/964,979, filed on Aug. 12, 2013, now Pat. No. 8,830,091, which is a (Continued)

(51) Int. Cl.
G08G 1/123     (2006.01)
G05D 1/02     (2006.01)

(Continued)

(52) U.S. Cl.
CPC ............ *G05D 1/0231* (2013.01); *G01C 21/12* (2013.01); *G05D 1/0234* (2013.01); *G05D 1/0246* (2013.01); *G05D 1/0272* (2013.01); *G05D 1/0274* (2013.01); *G06T 7/0044* (2013.01); *G06T 7/0065* (2013.01); *G05D 1/024* (2013.01); *G05D 1/0242* (2013.01);
(Continued)

(58) Field of Classification Search
CPC .................................................. G05D 1/0231
USPC ............ 340/995.1, 988; 318/568.11, 568.12, 318/568.16; 700/245, 253; 701/23; 901/1
See application file for complete search history.

(56) References Cited

U.S. PATENT DOCUMENTS 6,374,155 B1 *  4/2002  Wallach ............... G05D 1/0295
                                                              700/245
7,135,992 B2 *  11/2006  Karlsson ................ G01C 21/12
                                                              318/568.11

(Continued)

*Primary Examiner* — Brent Swarthout
(74) *Attorney, Agent, or Firm* — Myers Bigell & Sibley, PA

(57) ABSTRACT

The invention is related to methods and apparatus that use a visual sensor and dead reckoning sensors to process Simultaneous Localization and Mapping (SLAM). These techniques can be used in robot navigation. Advantageously, such visual techniques can be used to autonomously generate and update a map. Unlike with laser rangefinders, the visual techniques are economically practical in a wide range of applications and can be used in relatively dynamic environments, such as environments in which people move. One embodiment further advantageously uses multiple particles to maintain multiple hypotheses with respect to localization and mapping. Further advantageously, one embodiment maintains the particles in a relatively computationally-efficient manner, thereby permitting the SLAM processes to be performed in software using relatively inexpensive microprocessor-based computer systems.

20 Claims, 17 Drawing Sheets

Related U.S. Application Data continuation of application No. 13/615,174, filed on Sep. 13, 2012, now Pat. No. 8,508,388, and a continuation of application No. 12/724,312, filed on Mar. 15, 2010, now Pat. No. 8,274,406, which is a continuation of application No. 11/559,359, filed on Nov. 13, 2006, now Pat. No. 7,679,532, which is a division of application No. 10/739,902, filed on Dec. 17, 2003, now Pat. No. 7,135,992.

(60) Provisional application No. 60/434,269, filed on Dec. 17, 2002, provisional application No. 60/439,049, filed on Jan. 9, 2003.

(51) Int. Cl.
*G01C 21/12* (2006.01)
*G06T 7/00* (2006.01)

(52) U.S. Cl.
CPC ......... *G05D 1/0248* (2013.01); *G05D 1/0278* (2013.01); *G05D 2201/0207* (2013.01); *G05D 2201/0215* (2013.01); *G06T 2207/30204* (2013.01); *Y10S 901/01* (2013.01); *Y10S 901/46* (2013.01); *Y10S 901/47* (2013.01); *Y10S 901/50* (2013.01)

(56) References Cited

U.S. PATENT DOCUMENTS

| | | | |
|---|---|---|---|
| 7,679,532 B2* | 3/2010 | Karlsson et al. | 340/995.1 |
| 8,274,406 B2* | 9/2012 | Karlsson et al. | 340/995.1 |
| 8,508,388 B2* | 8/2013 | Karlsson et al. | 340/995.1 |
| 8,830,091 B2* | 9/2014 | Karlsson et al. | 340/995.1 |
| 9,110,470 B2* | 8/2015 | Karlsson et al. | 340/995.1 |

* cited by examiner (TOP VIEW)
LANDMARK RECORD CREATION (TOP VIEW)
LANDMARK REVISIT

PRE-FILTERING

SLAM REVIST LANDMARK

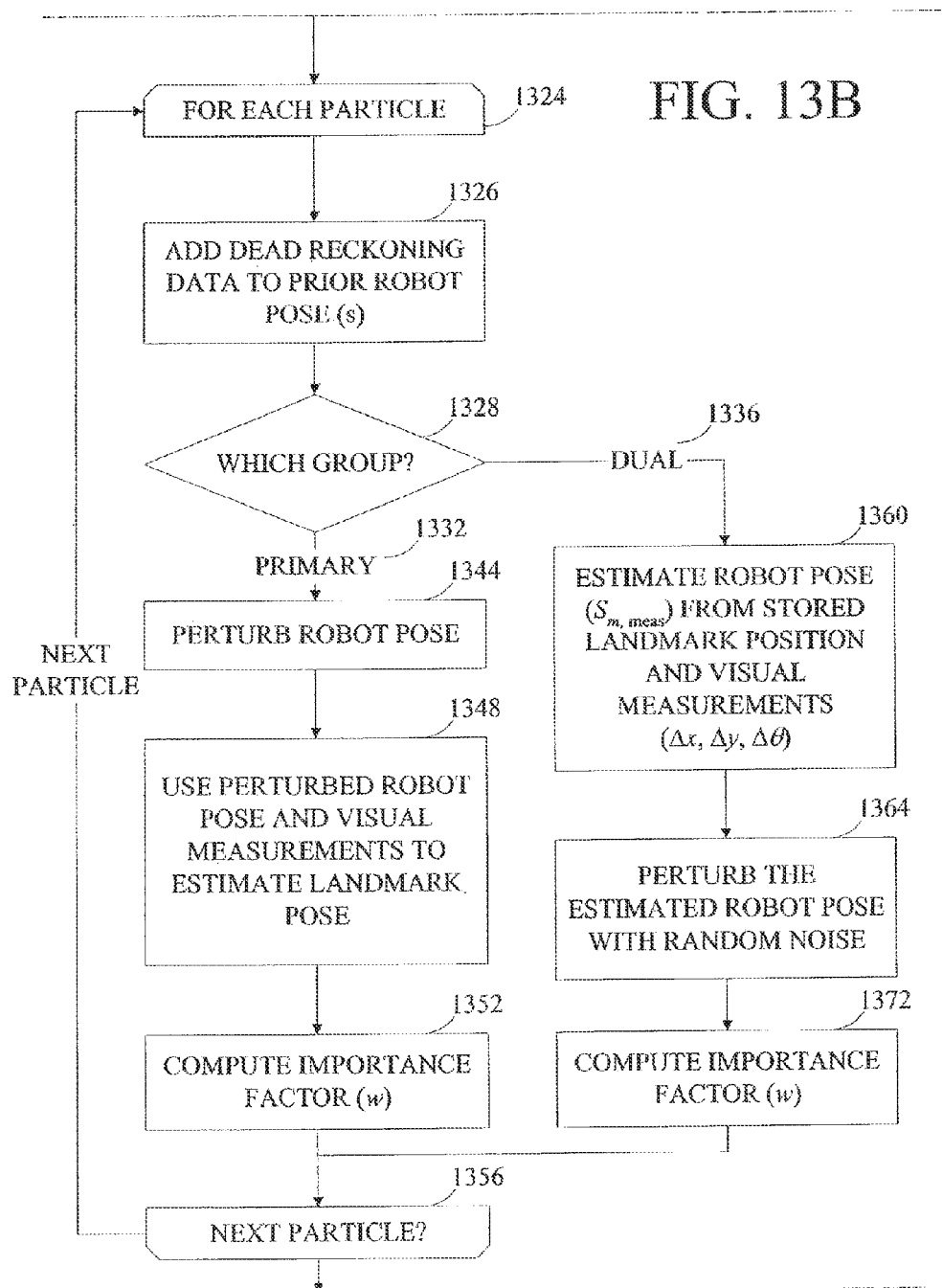

SYSTEMS AND METHODS FOR USING MULTIPLE HYPOTHESES IN A VISUAL SIMULTANEOUS LOCALIZATION AND MAPPING SYSTEM

RELATED APPLICATIONS

This application is a continuation application of U.S. application Ser. No. 14/271,260 filed May 6, 2014, now U.S. Pat. No. 9,110,470, which application was a continuation application of U.S. application Ser. No. 13/964,979, filed Aug. 12, 2013 (which issued on Sep. 9, 2014 as U.S. Pat. No. 8,830,091), which is a continuation application of U.S. application Ser. No. 13/615,174, filed Sep. 13, 2012, (which issued on Aug. 13, 2013 as U.S. Pat. No. 8,508,388), which is a continuation application of U.S. application Ser. No. 12/724,312, filed Mar. 15, 2010 (which issued on Sep. 25, 2012 as U.S. Pat. No. 8,274,406), which is a continuation application of U.S. application Ser. No. 11/559,359, filed on Nov. 13, 2006 (which issued on Mar. 16, 2010 as U.S. Pat. No. 7,679,532), which is a divisional application of U.S. application Ser. No. 10/739,902, filed Dec. 17, 2003 (which issued on Nov. 14, 2006 as U.S. Pat. No. 7,135,992), which claims the benefit under 35 U.S.C. §119(e) of U.S. Provisional Application No. 60/434,269, filed Dec. 17, 2002, and U.S. Provisional Application No. 60/439,049, filed Jan. 9, 2003, the entireties of which are hereby incorporated by reference.

This application is also related to commonly-owned application Ser. No. 10/739,935, filed on Dec. 17, 2003 (which issued on Aug. 10, 2010 as U.S. Pat. No. 7,774,158); to application Ser. No. 10/739,919, filed on Dec. 17, 2003 (which issued on Sep. 18, 2007 as U.S. Pat. No. 7,272,467); to commonly-owned application Ser. No. 10/739,937, filed on Dec. 17, 2003 (which issued on Mar. 21, 2006 as U.S. Pat. No. 7,015,831); to commonly-owned application Ser. No. 10/739,581, filed on Dec. 17, 2003 (which issued on Feb. 13, 2007 as U.S. Pat. No. 7,177,737); to commonly-owned application Ser. No. 10/739,394, filed on Dec. 17, 2003 (which issued on Dec. 5, 2006 as U.S. Pat. No. 7,145,478); and to commonly-owned application Ser. No. 10/739,927, filed on Dec. 17, 2003 (which issued on Jan. 9, 2007 as U.S. Pat. No. 7,162,338), the entireties of which are hereby incorporated by reference. This application is also related to application Ser. No. 11/562,877, filed Nov. 22, 2006 (which issued on Aug. 11, 2009 as U.S. Pat. No. 7,573,403).

BACKGROUND OF THE INVENTION

1. Field of the Invention

The invention generally relates to navigation of mobile devices. In particular, the invention relates to localization and mapping techniques that can be used in vehicles, such as in mobile robots.

2. Description of the Related Art

Mobile robots are becoming more and more commonplace in society. It will be understood that these robots can be embodied in a variety of forms, such as in automated vacuum cleaners. A variety of applications can be found for mobile robots, such as, but not limited to, entertainment applications, such as toy robots, utility applications in environments that are unfriendly to humans, such as space, deep water, cold temperature, radiation, chemical exposure, biohazards, etc., dangerous tasks such as defusing of potential explosives, operation in confined spaces, such as collapsed buildings, the performance of menial tasks, such as cleaning, etc. Conventional robots that are mobile do not include automated localization and/or mapping functionality.

Localization techniques refer to processes by which a robot determines its position with respect to its surroundings. For example, in a "pure" localization system, the robot is provided with a map of its surroundings. Such "pure" localization systems are disadvantageous because generating a map via manual techniques is a relatively difficult, labor-intensive, and specialized task. Moreover, many environments are not static. For example, the rearranging of furniture in a room can render a preexisting map unusable. As a result, maps in pure localization systems are subject to relatively frequent and costly updates such that the map accurately represents its surroundings.

Mapping techniques relate to processes by which a robot builds a map of its surroundings. A robot that can autonomously build a map of its surroundings and can localize itself within the map can advantageously exhibit a relatively high degree of autonomy. Moreover, such a robot can advantageously adapt to changes in its surroundings. This process of building a map and using the generated map is known as Simultaneous Localization and Mapping (SLAM). It will be understood that while SLAM relates to the building of a map (mapping) and the use of the map (localizing), a process associated with localization and a process associated with mapping need not actually be performed simultaneously for a system to perform SLAM. For example, procedures can be performed in a multiplexed fashion. Rather, it is sufficient that a system is capable of both localization and mapping in order to perform SLAM. For example, a SLAM system can use the same data to both localize a vehicle, such as a mobile robot, within a map and also to update the map.

SLAM processes typically use probabilistic techniques, such as Bayesian Estimation. Various states of a dynamic system, such as various hypotheses of a location of a robot and/or a map of robot, can be simultaneously maintained. With probabilistic techniques, a probability density function represents the distribution of probability over these various states of the system. The probability density function can be approximated with a finite number of sample points, termed "particles."

Conventional SLAM techniques exhibit relatively many disadvantages. For example, one conventional SLAM technique builds a map using a laser rangefinder. Such laser rangefinder techniques, while accurate, are relatively unreliable in dynamic environments such as environments where people are walking. In addition, a laser rangefinder is a relatively expensive instrument, and can be cost prohibitive for many robot applications.

One conventional SLAM technique uses an Expectation Maximization (EM) algorithm to generate a map. Disadvantageously, such EM techniques are computationally intensive and are difficult to compute in real time.

One conventional technique for localization uses visual images taken from a 3-camera array. Disadvantageously, low-production volume multiple cameras cost substantially more than mass-produced single cameras. Moreover, conventional techniques utilizing visual images are not capable of autonomous mapping.

SUMMARY OF THE INVENTION

Embodiments of the invention advantageously use a visual sensor and dead reckoning sensors to process Simultaneous Localization and Mapping (SLAM). Advantageously, such visual techniques can be used to autonomously generate and update a map. The visual techniques are applicable in a wide range of applications and can be used in relatively dynamic environments, such as environments in which people move. One embodiment further advantageously uses multiple particles to maintain multiple hypotheses with respect to localization and mapping. Further advantageously, one embodiment maintains the particles in a relatively computationally-efficient manner.

One embodiment is a method of localizing a mobile device in a multiple-particle autonomous localization and mapping system, where the method including: performing autonomous localization and mapping with a plurality of particles, where a particle includes a device pose and a map, where the map includes one or more landmarks; receiving an indication that a landmark has been detected; and updating at least one particle from the plurality of particles at least partly in response to receiving the indication of the detected landmark, wherein updating further includes: selectively categorizing a particle as one of a first type of particle and a second type of particle; and calculating an updated device pose estimate for a particle, wherein the technique used to calculate the updated device pose estimate is selected according to the type associated with the particle.

Another embodiment is a circuit for a mobile device that is configured to localize the mobile device in a multiple-particle autonomous localization and mapping system, where the circuit includes: a means for performing autonomous localization and mapping with a plurality of particles, where a particle includes a device pose and a map, where the map includes one or more landmarks: a means for receiving an indication that a landmark has been detected; and a means for updating at least one particle from the plurality of particles at least partly in response to receiving the indication of the detected landmark, wherein the means for updating further comprises: a means for selectively categorizing a particle as one of a first type of particle and a second type of particle; and a means for calculating an updated device pose estimate for a particle, wherein the technique used to calculate the updated device pose estimate is selected according to the type associated with the particle.

Another embodiment is a computer program embodied in a tangible medium for localizing a mobile device in a multiple-particle autonomous localization and mapping system, where the computer program includes: a module with instructions configured to perform autonomous localization and mapping with a plurality of particles, where a particle includes a device pose and a map, where the map includes one or more landmarks; a module with instructions configured to receive an indication that a landmark has been detected; and a module with instructions configured to update at least one particle from the plurality of particles at least partly in response to receiving the indication of the detected landmark, wherein the module with instructions configured to update further includes: instructions configured to selectively categorize a particle as one of a first type of particle and a second type of particle; and instructions configured to calculate an updated device pose estimate for a particle, wherein the technique used to calculate the updated device pose estimate is selected according to the type associated with the particle.

Another embodiment is a circuit for localizing a mobile device in a multiple-particle autonomous localization and mapping system, where the circuit includes: a circuit configured to perform autonomous localization and mapping with a plurality of particles, where a particle includes a device pose and a map, where the map includes one or more landmarks; a circuit configured to receive an indication that a landmark has been detected; and a circuit configured to update at least one particle from the plurality of particles at least partly in response to receiving the indication of the detected landmark, wherein the circuit configured to update further includes: a circuit configured to selectively categorize a particle as one of a first type of particle and a second type of particle; and a circuit configured to calculate an updated device pose estimate for a particle, wherein the technique used to calculate the updated device pose estimate is selected according to the type associated with the particle.

Another embodiment is a method of localizing a mobile device via a multiple-particle autonomous localization and mapping system, where the method includes: performing autonomous localization and mapping with a plurality of particles, where a particle includes a device pose estimate and a map, where the map includes one or more landmarks; receiving an indication that a landmark has been recognized and a visually-measured relative pose to the landmark has been estimated, where the landmark has been recognized using visual features from a visual sensor coupled to the mobile device, where the relative pose corresponds to a visually-measured difference in pose between a landmark pose and a pose corresponding to the visual observation; and updating at least one of the plurality of particles at least partly in response to receiving the indication of the recognized landmark, wherein updating further comprises: using a prior pose estimate and dead reckoning sensor data to compute a new pose estimate for particles in a selected group based on the estimated change in pose; and using the landmark pose and the visually-measured relative pose estimate to compute the new pose estimate for particles not in the selected group.

Another embodiment is a computer program embodied in a tangible medium for localizing a mobile device via a multiple-particle autonomous localization and mapping system, where the computer program includes: a module with instructions configured to perform autonomous localization and mapping with a plurality of particles, where a particle includes a device pose estimate and a map, where the map includes one or more landmarks; a module with instructions configured to receive an indication that a landmark has been recognized and a visually-measured relative pose to the landmark has been estimated, where the landmark has been recognized using visual features from a visual sensor coupled to the mobile device, where the relative pose corresponds to a visually-measured difference in pose between a landmark pose and a pose corresponding to the visual observation; and a module with instructions configured to update at least one of the plurality of particles at least partly in response to receiving the indication of the recognized landmark, wherein the module with instructions configured to update further includes: instructions configured to use a prior pose estimate and dead reckoning sensor data to compute a new pose estimate for particles in a selected group based on the estimated change in pose; and instructions configured to use the landmark pose and the visually-measured relative pose estimate to compute the new pose estimate for particles not in the selected group.

Another embodiment is a circuit for localizing a mobile device via a multiple-particle autonomous localization and mapping system, where the circuit includes: a circuit configured to perform autonomous localization and mapping with a plurality of particles, where a particle includes a device pose estimate and a map, where the map includes one or more landmarks; a circuit configured to receive an indication that a landmark has been recognized and a visually-measured relative pose to the landmark has been estimated, where the landmark has been recognized using visual features from a visual sensor coupled to the mobile device, where the relative pose corresponds to a visually-measured difference in pose between a landmark pose and a pose corresponding to the visual observation; and a circuit configured to update at least one of the plurality of particles at least partly in response to receiving the indication of the recognized landmark, further includes: a circuit configured to use a prior pose estimate and dead reckoning sensor data to compute a new pose estimate for particles in a selected group based on the estimated change in pose; and a circuit configured to use the landmark pose and the visually-measured relative pose estimate to compute the new pose estimate for particles not in the selected group.

BRIEF DESCRIPTION OF THE DRAWINGS

These and other features of the invention will now be described with reference to the drawings summarized below. These drawings (not to scale) and the associated descriptions are provided to illustrate preferred embodiments of the invention and are not intended to limit the scope of the invention.

Figure 1:
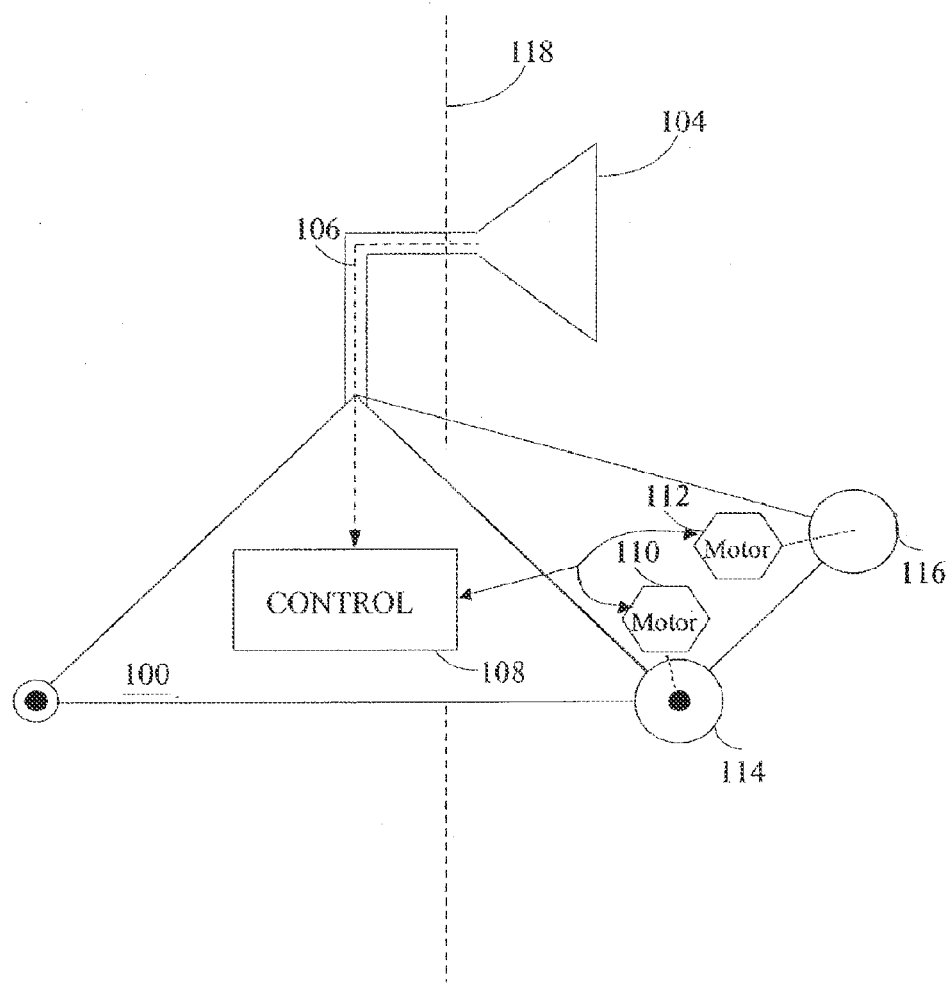
FIG. 1 illustrates an example of a robot.

GLOSSARY OF TERMS pose: the position and orientation, such as the position and orientation of a robot, in some reference frame.

robot pose (also known as global robot pose): the position and orientation of a robot in a global reference frame. In a configuration where a robot travels in two dimensions, such as along the surface of a floor, the robot pose can be specified by a two-dimensional position (x,y) and a heading ($\theta$).

relative robot pose: the position and orientation of a robot with respect to another reference frame, such as a landmark reference frame.

global reference frame: a reference frame that is fixed to the environment.

landmark reference frame the reference frame in which a landmark's 3-D structure is defined.

3-D structure: the 3-D coordinates of a set of 3-D features.

landmark: a landmark comprises a collection of 3-dimensional (3-D) features and a unique identifier.

3-D feature: an observable location, such as, for example, a portion of an object, with an associated 3-D coordinate in a reference frame and one or more associated 2-D features observable when viewing the location. It will be understood that a 3-D feature can be observed from one or more perspectives with varying 2-D features.

2-D feature: a position in an image and a descriptor that relates to the pixel at the position or the pixels in some neighborhood around that position.

physical landmark: a collection of visually-identifiable 3-D features in the environment.

landmark pose: the pose of the landmark reference frame in the global reference frame.

camera pose: a relative pose in the landmark reference frame based on the location of the visual sensor, which can be, for example, a camera.

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention.

Embodiments of the invention advantageously use one or more visual sensors and one or more dead reckoning sensors to process Simultaneous Localization and Mapping (SLAM). The combination of SLAM with visual sensors will hereafter be referred to as VSLAM. Advantageously, such visual techniques can be used by a vehicle, such as a mobile robot, to autonomously generate and update a map. In one embodiment, VSLAM is advantageously used by a portion of a vehicle, such as by an "arm" of a vehicle. In contrast to localization and mapping techniques that use laser rangefinders or other range-based devices or sensors, the visual techniques are economically practical in a wide range of applications and can be used in relatively dynamic environments, such as environments in which people move. One embodiment further advantageously uses multiple particles to maintain multiple hypotheses with respect to localization and mapping. Further advantageously, one embodiment maintains the particles in a relatively computationally-efficient manner, thereby permitting the SLAM processes to be performed in software using relatively inexpensive microprocessor-based computer systems.

It will be understood by one of ordinary skill in the art that mobile robots can be embodied in a variety of forms. In these variety of forms, a robot may be referred to by a different name, such as by a function that is performed by the robot. For example, a robot may be referred to as an automated sweeper or as an automated vacuum cleaner. In one embodiment, a mobile robot corresponds to a self-propelled object that can navigate in an autonomous or semi-autonomous manner. Examples of autonomous or semi-autonomous mobile robots include, but are not limited to, mobile robots for use in automated floor cleaners, humanoid robots, robots for experimentation and lab use, robots for delivering supplies, robots for exploring confined or inaccessible spaces, robots for entertainment or play, and the like.

The VSLAM techniques disclosed herein can advantageously be applied to autonomous robots and to non-autonomous robots. For example, the VSLAM techniques can be used with a manually-driven vehicle, such as a remotely-controlled vehicle for bomb detection. For example, the VSLAM techniques can be advantageously used in a remote-control application to assist an operator to navigate around an environment. In one embodiment, a vehicle can include various operational modes, such as a mode for manual control of the vehicle and another mode for an autonomous control of the vehicle. For example, the vehicle can be manually-driven during an initial mapping stage, and then later, the vehicle can be configured for autonomous control. In another embodiment, the VSLAM techniques can be used by a scout to create a map of the region. The scout can correspond to, for example, a person or another animal, such as a dog or a rat. The VSLAM used by the scout can be coupled to a video camera carried by the scout to observe the environment and to a dead reckoning device, such as an odometer, a pedometer, a GPS sensor, an inertial sensor, and the like, to measure displacement. The map generated by the scout can be stored and later used again by the scout or by another entity, such as by an autonomous robot. It will be understood that between the generation of the map by the scout and the use of the map by another entity, there can be additional processing to accommodate differences in visual sensors, differences in the installed height of the visual sensor, and the like.

Robots can be specified in a variety of configurations. A robot configuration typically includes at least one dead reckoning sensor and at least one video sensor. Another name for dead reckoning is "ded" reckoning or deduced reckoning. An example of a dead reckoning sensor is a wheel odometer, where a sensor, such as an optical wheel encoder, measures the rotation of a wheel. The rotation of wheels can indicate distance traveled, and a difference in the rotation of wheels can indicate changes in heading. With dead reckoning, the robot can compute course and distance traveled from a previous position and orientation (pose) and use this information to estimate a current position and orientation (pose). While relatively accurate over relatively short distances, dead reckoning sensing is prone to drift over time. It will be understood that the information provided by a dead reckoning sensor can correspond to either distance, to velocity, or to acceleration and can be converted as applicable. Other forms of dead reckoning can include a pedometer (for walking robots), measurements from an inertial measurement unit, optical sensors such as those used in optical mouse devices, and the like. Disadvantageously, drift errors can accumulate in dead reckoning measurements. With respect to a wheel odometer, examples of sources of drift include calibration errors, wheel slippage, and the like. These sources of drift can affect both the distance computations and the heading computations.

An example of a visual sensor is a digital camera. Embodiments of the invention advantageously use a visual sensor to recognize landmarks on a visual basis. These observations of visual landmarks can advantageously provide a global indication of position and can be used to correct for drift in the dead reckoning sensors. In contrast to simultaneous localization and mapping (SLAM) techniques that use a laser rangefinder, embodiments of the invention can use data from visual sensors and from dead reckoning sensors to provide simultaneous localization and mapping (SLAM) with advantageously little or no additional cost.

Exemplary Robot with VSLAM

FIG. 1 illustrates an example of a mobile robot 100 in which a VSLAM system can be incorporated. The illustrated robot 100 includes a visual sensor 104, which is used to visually recognize landmarks such that a SLAM module can determine global position. A broad variety of visual sensors can be used for the visual sensor 104. For example, the visual sensor 104 can correspond to a digital camera with a CCD imager, a CMOS imager, an infrared imager, and the like. The visual sensor 104 can include normal lenses or special lenses, such as wide-angle lenses, fish-eye lenses, omni-directional lenses, and the like. Further, the lens can include reflective surfaces, such as planar, parabolic, or conical mirrors, which can be used to provide a relatively large field of view or multiple viewpoints. In another example, the visual sensor 104 can correspond to a single camera or to multiple cameras. In one embodiment, the VSLAM system is advantageously configured to operate with a single camera, which advantageously reduces cost when compared to multiple cameras.

The motors 110, 112 of the illustrated robot 100 are coupled to wheels 114, 116 to provide locomotion for the robot 100. It will be understood by one of ordinary skill in the art that instead of or in addition to wheels, other embodiments of the robot can use legs, tracks, rollers, propellers, and the like, to move around. In the illustrated embodiment, information regarding the rotation of the wheels, also known as odometry, is provided as an input to a control 108. Image data 106 from the visual sensor 104 is also provided as an input to the control 108 for the robot 100. In one embodiment, the VSLAM system is embodied within the control 108. In the illustrated embodiment, the control 108 is coupled to motors 110, 112 to control the movement of the robot 100. For clarity, a power source for the robot 100, such as a battery, is not shown in FIG. 1.

In response to the image data 106, the control 108 can provide control signals to the motors 110, 112 that control the movement of the robot 100. For example, the control 108 can provide control signals to instruct the robot to move forward, to stop, to move backward, to turn, to rotate about a vertical axis, and the like. When the robot rotates around a vertical axis, such as the exemplary vertical axis 118 shown in FIG. 1, this rotation is referred to as "yaw." Convention used herein to describe the pose, that is, the orientation and the position of the robot, will be described in greater detail later in connection with FIG. 4.

The control 108 can include hardware, such as microprocessors, memory, etc., can include firmware, can include software, can include network communication equipment, and the like. In one embodiment, the control 108 uses dedicated hardware, such as single-board computers, application specific integrated circuits (ASICs), field programmable gate arrays (FPGAs), and the like. Examples of system architectures for a VSLAM system will be described in greater detail later in connection with FIGS. 6, 14, and 15.

In one embodiment, the control 108 is implemented by interfacing to a general-purpose computer, such as to a laptop computer, and by software executing in the computer. In one example, a laptop computer with an Intel® Pentium® 4 processor with a 2.4 GHz clock speed can process landmark generation processes in about 1 second and can process visual measurements in about half a second. It will be understood that the processing time can depend on parameters such as image resolution, frame rates, bus speeds, and the like. The software can include instructions that are embodied in a tangible medium, such as a hard disk or an optical disk. Data processing for the robot 100 can be performed entirely within the robot 100 such that the robot 100 is autonomous, or the data processing can be performed partially outside the robot 100. For example, the control 108 can be configured to relay data to another computer, via a network such as a wireless network, where a portion of the data processing takes place. An example of a data structure for a relational database for use in a VSLAM system will be described later in connection with FIG. 8. Examples of data processing will be described in greater detail later in connection with FIGS. 9-13.

An Example of Experimental Results

Figure 2:
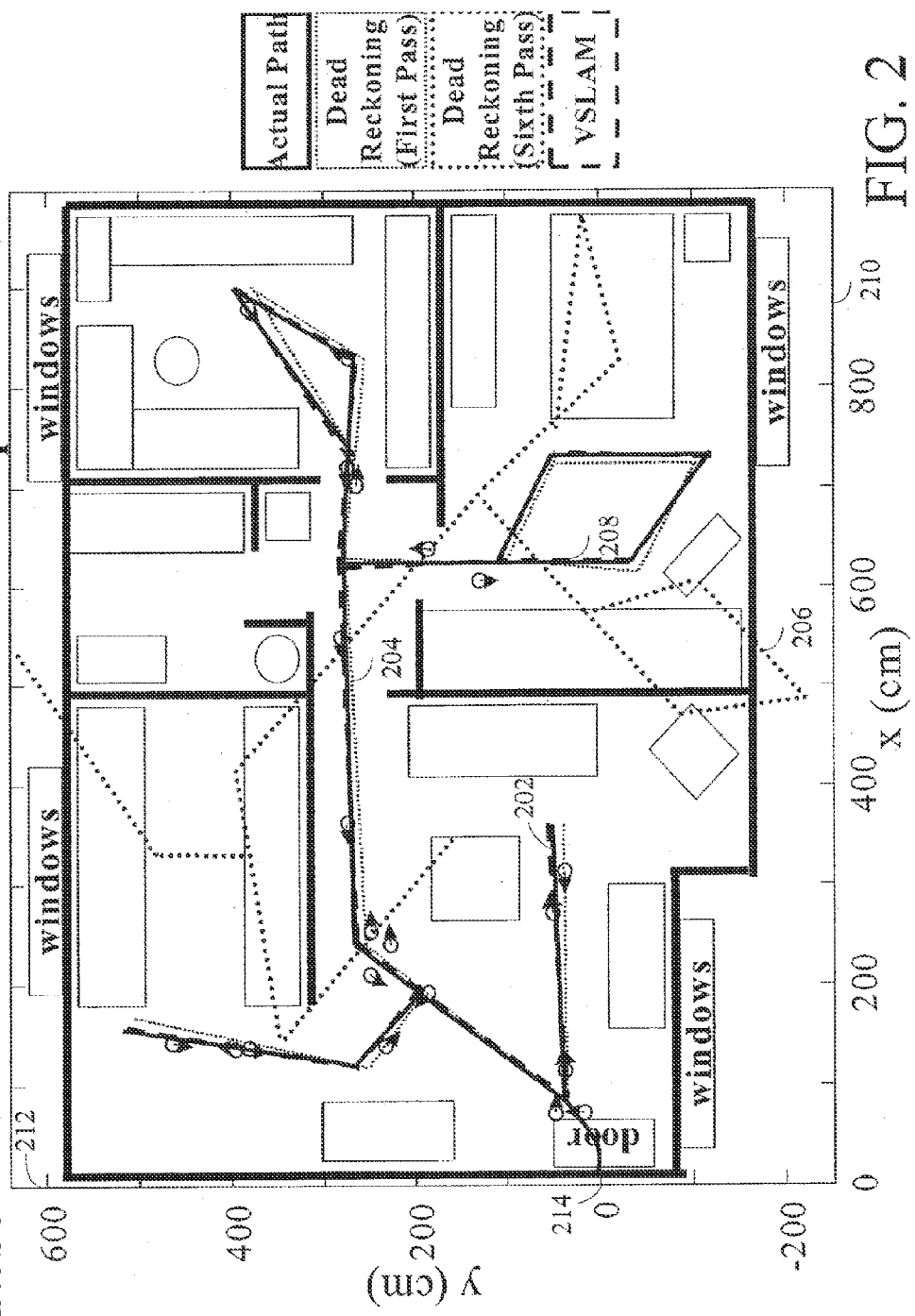
FIG. 2 is a top view of a room with obstacles illustrating an actual path taken by a robot, a first path estimated through dead reckoning measurements alone, a second path estimated through dead reckoning measurements alone, and a path estimated through visual simultaneous localization and mapping (VSLAM).

FIG. 2 is a top view of an apartment with objects, such as walls furniture, and the like. FIG. 2 illustrates an actual path 202 taken by a robot, a first path 204 estimated through dead reckoning measurements alone, a second path 206 estimated through dead reckoning measurements alone, and a path estimated through VSLAM 208.

In one embodiment, the global position of the robot is represented by Cartesian (x-y) coordinates as shown in FIG. 2. It will be understood that other coordinate systems, such as polar coordinates, can also be used. With respect to FIG. 2, a horizontal axis 210 corresponds to the x-axis. A vertical axis 212 corresponds to the y-axis. The coordinate system used herein will be described in greater detail later in connection with FIG. 4.

In one embodiment, the N-dimensional zero vector (0,0,0) for (x,y,θ) for the system is set when the robot is initialized or is reset. Unless the zero vector is reset by, for example, a deliberate reset, a system reset, re-initialization process, and the like, the zero vector stays fixed for the global reference frame. By contrast, a relative reference frame with a moving zero vector relative to the global reference frame will be described later in connection with FIGS. 5A and 5B. In addition, it will be understood that the N-dimensional zero vector can further include other dimensions, such as height z, roll, and pitch, as applicable. Returning now to the example shown in FIG. 2, a zero vector 214 is located at approximately the entrance to the apartment, but it will be understood that the location of the zero vector 214 can be located virtually anywhere. In addition, it should be noted that the system can be configured to set the zero vector to locations other than where the robot is initialized or is reset, such as, for example, a location where a landmark is first observed.

As a robot with VSLAM travels in its environment, such as the apartment shown, the robot can observe physical landmarks. As will be explained in greater detail later, these physical landmarks can be related to landmarks created and stored in a database. Advantageously, the VSLAM techniques do not require artificial navigational beacons to be placed in the environment. Rather, VSLAM techniques can conveniently be used in unaltered and unmodified environments. However, it will be understood that should artificial navigational beacons be present in an environment, the VSLAM techniques can utilize features from the beacons and/or the surrounding environment as landmarks. For example, in a landmarks database, where a landmark can correspond to a collection of 3-D features and the corresponding 2-D features from which the 3-D features are computed. It should also be noted that a physical landmark can correspond to one or more physical objects, such as, for example, an object mounted to a wall and a portion of the wall. These physical landmarks are used to estimate global position such that drift in dead reckoning measurements can later be corrected or compensated. It should be noted that a physical landmark will typically be arranged in a particular location and orientation in the global reference frame, and that the observing robot will be at a different location and orientation. In the illustrated embodiment, the locations of the features of the physical landmark are referenced relative to the landmark reference frame. Then, the pose of the landmark itself is referenced to the global reference frame.

The estimated poses of selected landmarks are illustrated in FIG. 2. In FIG. 2, examples of global position (x,y) for the robot pose when the robot perceives a physical landmark are indicated by circles. It will be understood that while the VSLAM system is generally described in the context of a robot, the VSLAM system can also be used in a variety of devices such that the robot pose can also correspond to a device pose. The orientation (θ) of the robot as it observes the physical landmark and creates the landmark in the database is indicated with an arrow. In one embodiment, the initial estimate of the pose of the "landmark" that is referenced in the global reference frame corresponds to the pose of the robot when creating the landmark. When a new physical landmark is observed and a landmark is created, the set of 3-D features and their corresponding 2-D features that visually identify the landmark are stored. In one example, the 2-D features correspond to SIFT features. The concept of SIFT has been extensively described in the literature. See David G. Lowe, *Local Feature View Clustering for 3D Object Recognition*, Proceedings of the IEEE Conference on Computer Vision and Pattern Recognition, Kauai, Hi. (December 2001).

As illustrated in FIG. 2, the path estimated through VSLAM 208 is advantageously much more accurate than the second path 206 estimated through dead reckoning measurements alone. Over relatively short distances, dead reckoning measurements, such as those obtained from odometry readings, can be quite accurate. For example, the first path 204 taken after a single pass estimated through dead reckoning measurements alone is relatively close to the actual path 202. However, due to calibration errors, wheel slippage, and the like, these dead reckoning measurements can drift or accumulate errors over distance and/or time such that a position calculated after a relatively long period of time can vary significantly from a position that was initially calculated even when the errors in the dead reckoning measurements are relatively small. For example, over an extended period of time, the robot can make relatively many traversals over an environment, thereby accumulating errors in drift. In the example illustrated in FIG. 2, the second path 206 estimated through dead reckoning measurements alone was calculated after about 6 passes around the apartment. As illustrated by FIG. 2, the disparity between the actual path 202 and the second path 206 estimated through dead reckoning measurements alone can be pronounced.

Advantageously, the VSLAM techniques can wholly or partially compensate for the drift in the dead reckoning measurements such that even after a robot has traveled over relatively large distances, the global position of the robot can be maintained with relatively high accuracy. In one embodiment, the VSLAM techniques maintain the accuracy of the global robot pose estimate to exceed the accuracy of the visual measurements even after the robot has traversed relatively long distances. In the illustrated example, the visual sensor used was a relatively simple and inexpensive color camera with a resolution of 640×480, and the accuracy of the visual measurements was maintained to about 10 centimeters (cm). It will be understood that other visual sensors, such as grayscale cameras and infrared cameras, can also be used. In FIG. 2, the path estimated through VSLAM 208 was computed under the same conditions as the second path 206 estimated through dead reckoning measurements alone. As illustrated by FIG. 2, the path estimated through VSLAM 208 is relatively close to the actual path 202 and is advantageously relatively more accurate than the second path 206 estimated through dead reckoning measurements alone.

Examples of Different Perspectives for Visual Localization

Figure 3A:
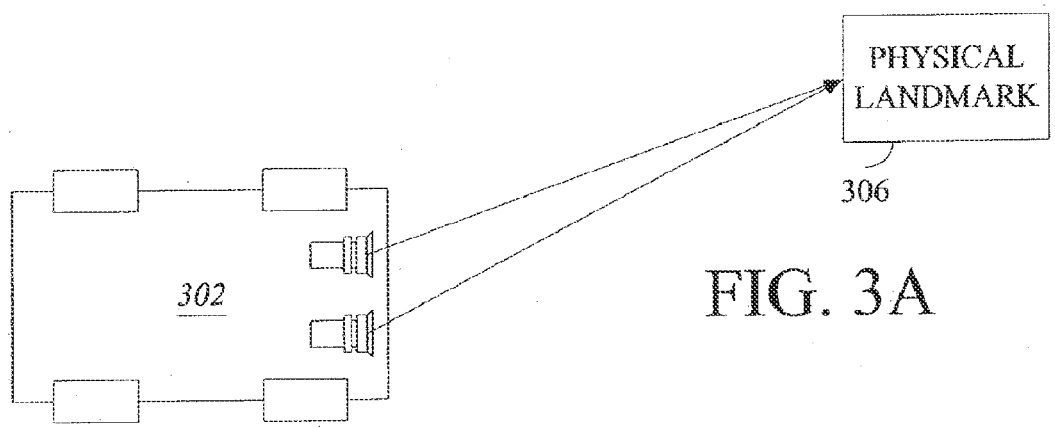
FIG. 3A illustrates the use of multiple cameras to determine a 3-D position of a visual landmark.

FIG. 3A illustrates the use of multiple cameras or multiple visual sensors to determine a 3-D position of a physical landmark for VSLAM. In one embodiment, a robot 302 is equipped with multiple visual sensors that are spaced a known distance apart to provide a stereoscopic view, such as a binocular view or a trinoculor view, of a physical landmark 306. An example of a trinoculor camera is the Digiclops™ camera available from Point Grey Research Inc., of Vancouver, British Columbia, Canada.

Advantageously, camera systems that provide a stereoscopic view, such as binocular or trinocular camera systems, can be used to identify 3-D features of a landmark and to estimate displacements to the 3-D features in a relatively fast and efficient manner. Disadvantageously, such cameras are produced in relatively low volumes and can be relatively expensive relative to single visual sensor cameras due to the extra components and to the relative lack of economies of scale.

Figure 3B:
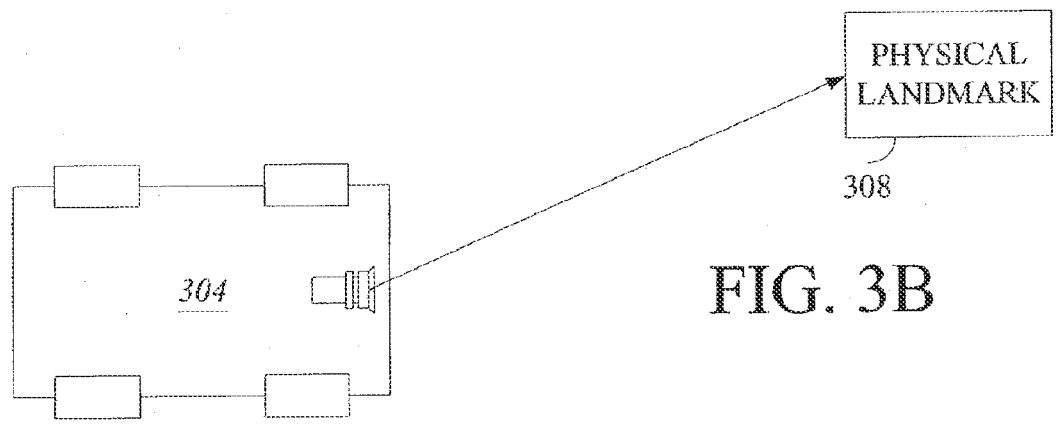
FIGS. 3B and 3C illustrate the use of a single camera to determine a 3-D position of a visual landmark.
Figure 3C:
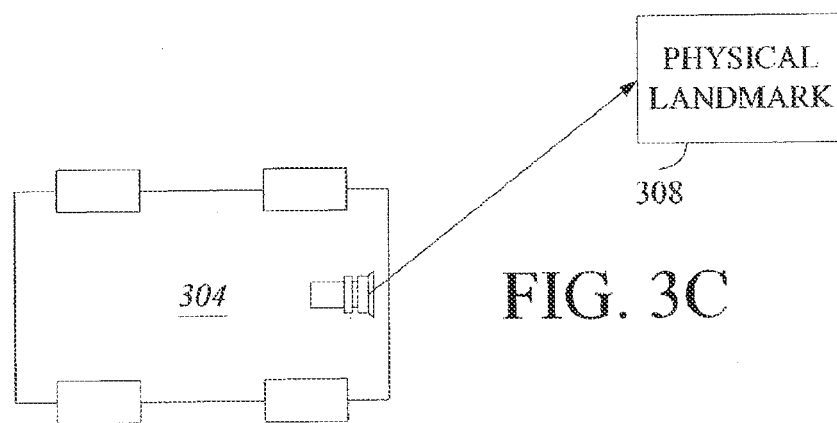

FIGS. 3B and 3C illustrate the use of a single camera to estimate the 3-D structure of a landmark 308. The use of a single camera in the processing of VSLAM advantageously permits relatively common and inexpensive visual sensors to be used for VSLAM visual processing. Moreover, many configurations of robots are already configured with a single camera, which can be used with the VSLAM processing such that no additional camera is needed.

To obtain multiple perspective views from images taken from a single camera, the images are taken from different locations, such as, for example, from 3 different positions. For example, FIGS. 3B and 3C illustrate how a robot 304 moves from a first position as shown in FIG. 3B to a second position as shown in FIG. 3C. In both FIGS. 3B and 3C, the robot 304 observes the same physical landmark 308. In one embodiment, the robot 304 monitors the distance traveled by odometry or another dead reckoning source, and selects at least 2 images, such as, for example, 2 or 3 images, taken at about 10 centimeters (cm) apart for the perspective views. It will be understood that an appropriate amount of distance traveled between selected images can vary in a broad range and can vary depending on the environment in which the robot 304 operates. In one embodiment, the robot 304 travels a minimum predetermined distance between images used for the perspective views. This minimum predetermined distance can be adaptively determined at least partly in response to the operating environment of the robot 304. For example, the minimum predetermined distance can correspond to a fixed percentage, such as 5%, of an average displacement to observed features. Other applicable percentages will be readily determined by one of ordinary skill in the art. These perspective views can be used to determine the positions of 3-D features of new landmarks. As will be explained in greater detail later, in one embodiment, such perspective views are not used when a landmark is revisited.

Illustrations of Robot Pose and Global Reference Frame

Figure 4:
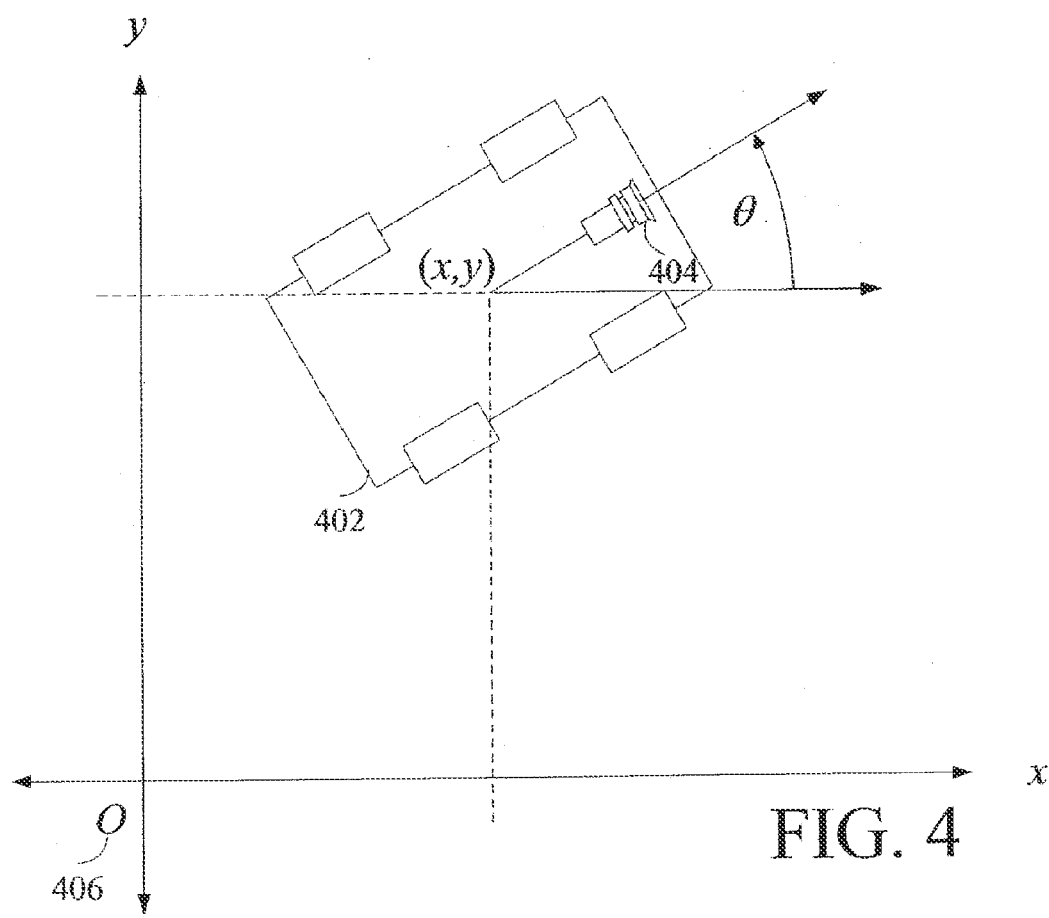
FIG. 4 illustrates a pose of a robot in a global reference frame.

The "pose" of a robot includes the position of the robot and the orientation or heading of the robot within the global reference frame. FIG. 4 illustrates a position (x,y) of the pose of a robot 402 in a global reference frame. It will be understood that the position does not have to correspond precisely to the center of the robot 402, as the robot 402 occupies an area of space larger than a point. A zero vector 406 for the global reference frame can correspond to one of a variety of locations within an environment. In the illustrated examples, the zero vector 406 for the global reference frame is set at the location where the robot 402 was initialized. In one embodiment, the x-direction for this global reference frame corresponds to an axis directly in front of the robot when the robot was initialized. For example, in the illustrated embodiment, the x-axis corresponds to the path traveled by the robot when the robot travels directly in the forward direction upon initialization at the zero vector 406. In the illustrated embodiment, the y-direction corresponds to an axis orthogonal to the x-axis, with the positive y-axis increasing to the left of the x-axis when viewed from above. It will be understood that the zero vector for reference frame and the alignment of the x-axis and they-axis with respect to the zero vector can depend on where the robot is located and the orientation of the robot at the time the zero vector is set, such as, for example, at the time of initialization.

In addition to displacement along the x-axis direction or the y-axis direction, a typical mobile robot can also rotate or "yaw" about a vertical axis. It will be understood that robots do not have to directly rotate or yaw to change orientation. For example, the act of turning around a corner also changes the orientation or heading of the robot.

FIG. 4 also illustrates an orientation of the pose of a robot in a global reference frame. In the illustrated embodiment, the orientation θ for the robot is referenced to the initial heading that the robot had when the zero vector was set. Advantageously, the location of the robot and the initial orientation for the robot is arbitrary, thereby simplifying setup of the robot for the user.

In one embodiment, the global reference frame described in FIG. 4 is used by the SLAM portion of the VSLAM, such as a SLAM module 604 which will be described in greater detail later in connection with FIG. 6. By contrast, a relative reference frame is used for the visual front-end portion of VSLAM, such as by a Visual Front End 602 of FIG. 6. The relative reference frame will also be described in further detail later in connection with FIGS. 5A and 5B.

Illustrations of Visual Measurements

Figure 5A:
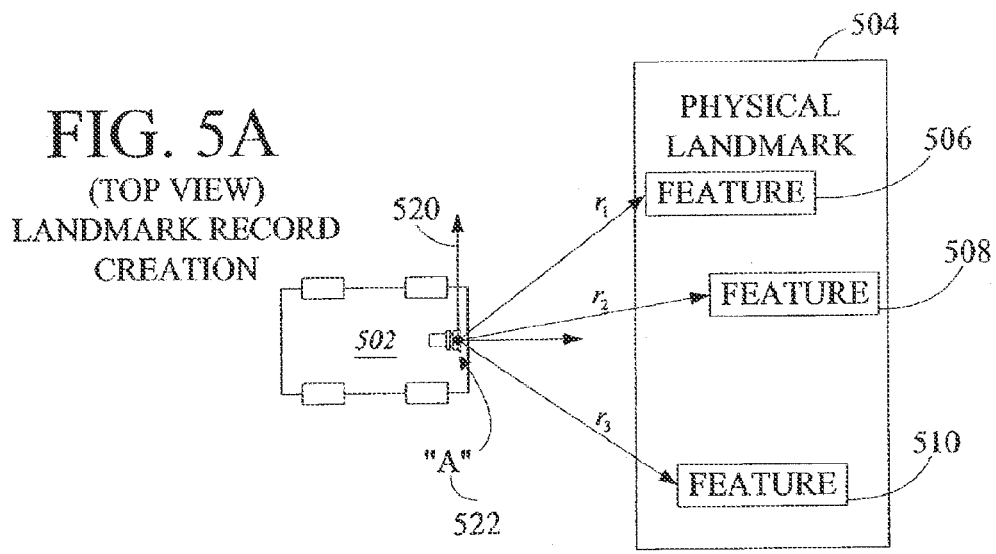
FIG. 5A illustrates a robot reference frame in the context of creating a record in a landmark database.
Figure 5B:
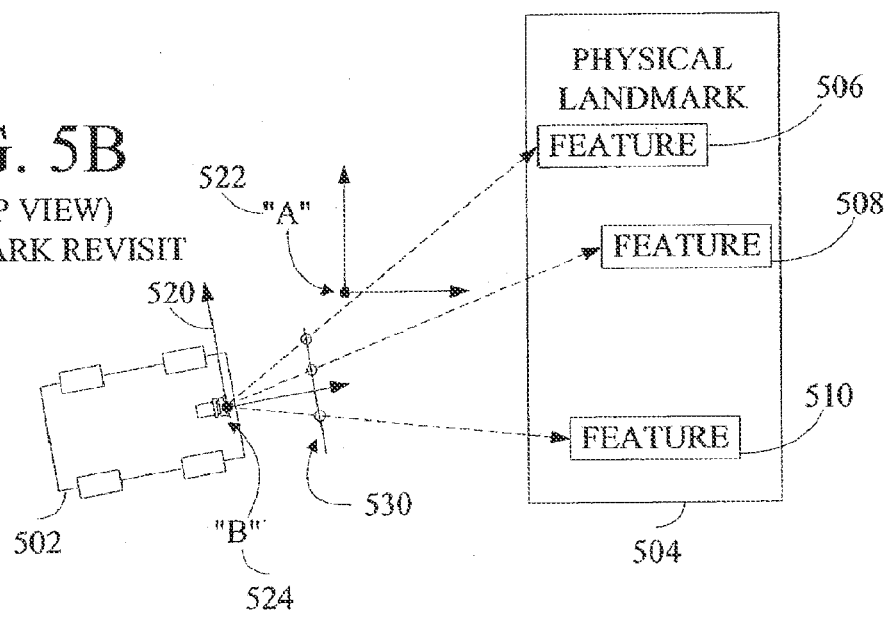
FIG. 5B illustrates a landmark reference frame and a robot reference frame in the context of revisiting a landmark.

FIGS. 5A and 5B (not to scale) illustrate a robot 502 and a corresponding robot reference frame 520. In the illustrated embodiment, the robot reference frame 520 is used by the visual localization portion of a VSLAM system, such as the Visual Front End 602 of FIG. 6. The zero vector for the robot reference fame 520 moves with the robot 502. As such, the robot reference frame 520 is a relative reference frame, as opposed to a global reference frame that has a globally-fixed zero vector. For example, the zero vector for the robot reference frame 520 can be located approximately at the camera of the robot 502 and is illustrated in FIG. 5A by a pose "A" 522 and in FIG. 5B by a pose "B" 524.

As the robot 502 travels in its environment, the robot 502 detects new physical landmarks and revisits previously detected or "old" physical landmarks. FIG. 5A illustrates the robot reference frame 520 in the context of "creating" or recognizing a new landmark, i.e., creating an entry in a database for a freshly observed landmark. A process in a visual front end or visual localization process for recognizing a new landmark will be described in greater detail later in connection with FIG. 10. FIG. 5B illustrates the robot reference frame 520 in the context of revisiting a previously observed and recorded landmark. The robot reference frame 520 moves with the robot 502 such that the pose "A" 522 corresponding to the pose of the robot, with respect to the global reference frame, at the time when the landmark was created, and the pose "B" 524 corresponding to the pose of the robot, with respect to the global reference frame, at the time when the landmark was revisited can be different as illustrated in FIG. 5B.

Returning now to FIG. 5A, in the illustrated embodiment, a physical landmark 504 is identified by its 3-D features. In one embodiment, 3-D features are extracted by triangulating 2-dimensional (2-D) features by solving the structure and motion problem using the trifocal tensor method. In one embodiment, the 2-D features are SIFT features. A discussion of SIFT features can be found in Lowe, id. See Olivier Faugeras and Quang-Tuan Luong, *The Geometry of Multiple Images*, MIT Press (2001) for a discussion of the trifocal tensor method. It will be understood that the physical landmark 504 can be characterized by relatively many 3-D features and that the physical landmark 504 can correspond to one or more physical objects or to a portion of physical object. For clarity, the physical landmark 504 illustrated in FIG. 5A is drawn with 3 3-D features: a first feature 506, a second feature 508, and a third feature 510. When the robot 502 observes a new physical landmark, the visual front end determines the displacements or positions from the robot 502 to the respective features. When a landmark is created, the robot 502 can reference displacements to visual features using the current position of the robot reference frame 520 as an initial estimate of a landmark reference frame. For example, in the example illustrated in FIG. 5A, arrows $r_1$, $r_2$, and $r_3$ represent 3-dimensional displacements, such as displacements in x, y, and z dimensions between the robot 502 and the first feature 506, the second feature 508, and the third feature 510, respectively. It should be noted that these x, y, and z displacements are relative to the robot reference frame of the robot 502 and not to the global reference frame. In one embodiment, the x, y, and z displacements correspond to relative displacements in the fore-aft dimension, in the left-right dimension, and in the up-down dimension, respectively. In addition, the 2-D image coordinates or locations for the 3-D features are also stored. For example, where the visual sensor corresponds to a 640×480 color camera, the 2-D image coordinates correspond to one or more pixel locations that correspond to the 3-D features. It will be understood that 3-D features will typically occupy more than merely a single point in space.

In one embodiment, where the robot 502 moves as the images are taken for the perspective views for the computation of the displacements $r_1$, $r_2$, and $r_3$, the displacements from the robot 502 to the features are referenced to the first image in a three-image set. However, it will be appreciated that any identifiable reference frame can be used as the reference. For example, the other images in the image set can also be used as the reference, so long as the image used as the reference is consistently selected. It should also be noted that an identifiable reference frame that does not correspond to any particular image can also be used. For example, in the illustrated embodiment, the pose of the robot corresponding to the first image in the three-image set is used as the local reference flame for the particular landmark, i.e., the landmark reference frame.

Figure 6:
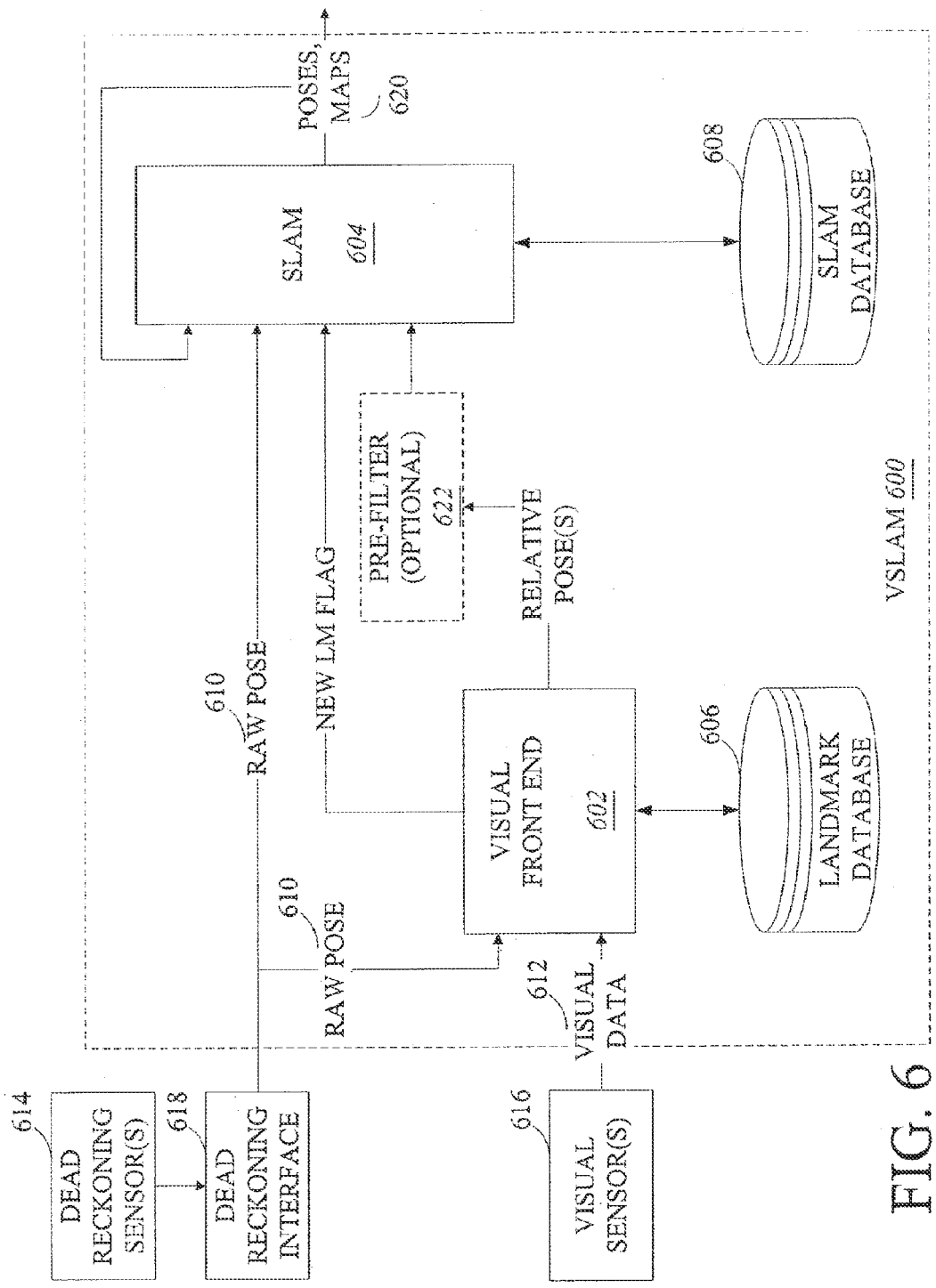
FIG. 6 illustrates one embodiment of a system architecture for a VSLAM system.

In one embodiment, when a new physical landmark is encountered, the Visual Front End 602 stores (i) the 3-D coordinates of the 3-D features in the local reference frame for the landmark in a database, such as a landmark database 606 of FIG. 6 and (ii) the 2-D features for a selected image, such as the 2-D features of the first image, corresponding to the 3-D features. An example of a data structure for the landmark database 606 will be described later in connection with FIG. 8. In one embodiment, when the new physical landmark is encountered and processed by the Visual Front End 602, the SLAM module 604 correspondingly "creates" a landmark by storing an initial estimate of the landmark pose, such as the global robot pose when the landmark was created, computed from the change in pose as provided by the dead reckoning data for each particle from the last pose of the robot for the corresponding particle. An example of a process that can be performed by the SLAM module 604 when creating a new landmark will be described in greater detail later in connection with FIG. 11.

Figure 5C:
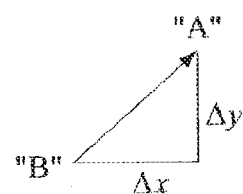
FIG. 5C illustrates the convention used to describe a $\Delta x$ and a $\Delta y$ calculation.
Figure 5D:
FIG. 5D illustrates the convention used to describe a $\Delta\theta$ calculation.

FIG. 5B illustrates an example of the robot 502 revisiting the physical landmark 504 earlier observed, termed "new view." In FIG. 5B, the robot 502 is displaced from the original pose "A," which corresponds to the "landmark reference frame," to a new pose "B." Correspondingly, the robot reference frame also moves with the robot 502. The robot 502 again observes the first feature 506, the second feature 508, and the third feature 510. It will be understood that as the robot 502 moves about, some of the features of a physical landmark may not be observable in all locations. The Visual Front End 602 of the robot 502 computes the relative pose, i.e., the difference between new pose "B" and pose "A," as illustrated in FIGS. 5C and 5D and provides one or more relative poses to one or more identified landmarks as an input to the SLAM module 604 or to the Pre-Filter module 622. In one embodiment, the Visual Front End 602 computes the relative pose of the robot with respect to the stored landmark reference frame illustrated as "A" by finding the relative pose of the robot that minimizes the projection error from the 3-D features onto the 2-D coordinates of the first feature 506, the second feature 508, and the third feature 510.

Dashed lines between the robot 502 and the features 506, 508, 510 represent the projection of the features 506, 508, 510 onto an image plane, which is illustrated by a line. 530 in the top view of FIG. 5B. It will be understood that the image plane for a visual sensor, such as a camera, will typically be approximately perpendicular to the focal axis of the camera. It will also be understood that the line 530 approximately represents the field of view of the camera for the projection of the points and does not indicate any particular distance from the camera.

Given the correspondence between the 2-D features in the new view and the 3-D features of the landmark, the Visual Front End 602 can estimate the relative pose by, for example, minimizing projection error. The relative pose reveals a change in pose from (i) the pose when the landmark was created and stored in the database to (ii) the pose when the physical landmark was re-observed. It will be understood that such a relative pose can be represented in a variety of coordinate forms. For example, the translational component of the relative pose along the floor can be represented by Cartesian coordinates (x,y). However, it will also be understood that polar coordinates (ρ,φ) can also be used. FIG. 5C and FIG. 5D graphically illustrate the relative pose also known as "camera pose" components of Δx, Δy, and Δθ. While the term "camera pose" includes the word "camera," it will be understood that visual sensors other than cameras can also be used. The relative pose can also include a change in vertical dimension, roll, and pitch, which can be the result of uneven floor surfaces, robot and/or camera movement in these dimensions, misidentified landmarks, changes in the physical landmarks in the environment, and the like. In one embodiment, these additional dimensions are advantageously used to test the validity of the identified landmark, as will be described later in greater detail in connection with the Pre-Filtering process of FIG. 12. In one embodiment, the Cartesian-coordinate relative pose is used between a visual front-end and a SLAM module when re-encountering landmarks, and a polar-coordinate "delta pose" is used in the SLAM module when computing change in pose between points measured by dead reckoning data.

In one embodiment, the pose of the robot according to dead reckoning sensor data as the robot travels in its environment is stored with a corresponding timestamp in a matrix, such as in a Dead Reckoning Data Matrix 812, which will be described later in connection with FIG. 8. Retrieval of poses according to two points in time permits change in heading, direction traveled, and distance traveled to be computed between the two points in time.

Example of a System Architecture for VSLAM

FIG. 6 illustrates one embodiment of a system architecture for a VSLAM system 600. It will be understood that the VSLAM system 600 can be implemented in a variety of ways, such as by dedicated hardware, by software executed by a microprocessor, or by a combination of both dedicated hardware and software.

Inputs to the VSLAM system 600 include raw pose data 610 from one or more dead reckoning sensors 614 and also include visual data 612 from one or more cameras or other visual sensors 616. It will be understood that a dead reckoning sensor 614, such as an optical wheel encoder, can communicate with the VSLAM system 600 via a dead reckoning interface 618, such as via a driver or via a hardware abstraction layer. The raw pose data 610 can correspond to distance traveled, to velocity, to acceleration, and the like, and can depend on the type of dead reckoning sensor used. Outputs from the VSLAM system 600 can include one or more poses and maps 620.

The raw pose data 610 and the visual data 612 are provided as inputs to the Visual Front End 602. The Visual Front End 602 can perform a variety of functions, such as identify landmarks, identify 3-D features for landmarks, calculate delta pose, and the like. Examples of processes that can be performed by the Visual Front End 602 will be described in greater detail later in connection with FIGS. 9 and 10. A system architecture for the Visual Front End 602 will be described in greater detail later in connection with FIG. 14.

The Visual Front End 602 can use the raw pose data 610 to determine the approximate distance traveled between the images in the visual data 612, which are then used in computations to measure the displacements to the features. When new physical landmarks are recognized, corresponding records or entries can be added to the landmark database 606. A sample data structure for the landmark database 606 will be described later in connection with FIG. 8. Newly recognized landmarks can also be indicated to the SLAM module 604. For example, a "new landmark" flag can be activated, and a "new landmark" identifier or tag can be provided to the SLAM module such that the appropriate records in a SLAM database 608 and the landmark database 606 can be matched. When previously recognized landmarks are encountered, the Visual Front End 602 can provide the SLAM module 604 or an optional Pre-Filter module 622 with one or more identifiers or tags to indicate the one or more landmarks encountered, relative pose information, such as relative pose information (Δx, Δy, and Δθ), and data reliability measures as applicable.

The optional Pro-Filter module 622 analyzes the data reliability measures provided by the Visual Front End 602. The data reliability measures can be used as an indication of the reliability of the identification of the physical landmark by the Visual Front End 602. For example, the Pre-Filter module 622 can advantageously be used to identify a landmark measurement identified by the Visual Front End 602, which may have been inaccurately identified and can correspond to an outlier with respect to other landmarks in a map. In one embodiment, when the Pre-Filter module 622 identifies a potentially inaccurate visual measurement, the Pre-Filter module 622 does not pass the identified visual landmark data onto the SLAM module 604 such that the VSLAM system 600 effectively ignores the potentially inaccurate landmark measurement. Pre-filtering of data to the SLAM module 604 can advantageously enhance the robustness and accuracy of one or more poses (position and orientation) and maps 620 estimated by the SLAM module 604.

A process that can be performed by the Pre-Filter module 622 will be described in greater detail later in connection with FIG. 12. A system architecture of the Pre-Filter module 622 will be described is greater detail later in connection with FIG. 15.

Figure 7A:
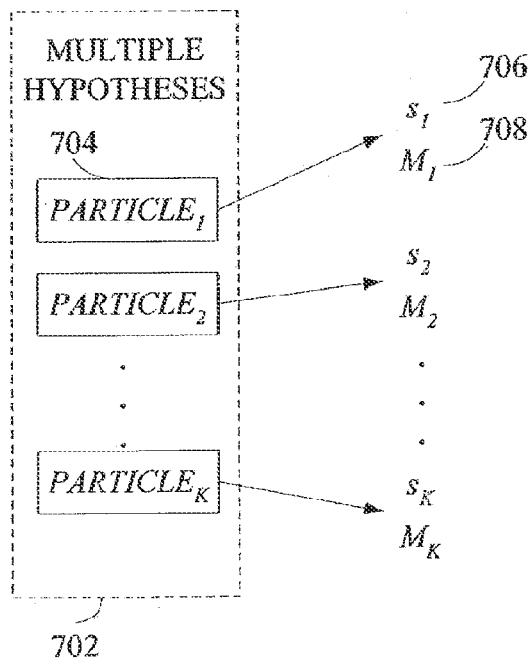
FIG. 7A illustrates multiple particles in a multiple-hypothesis VSLAM system.
Figure 7B:
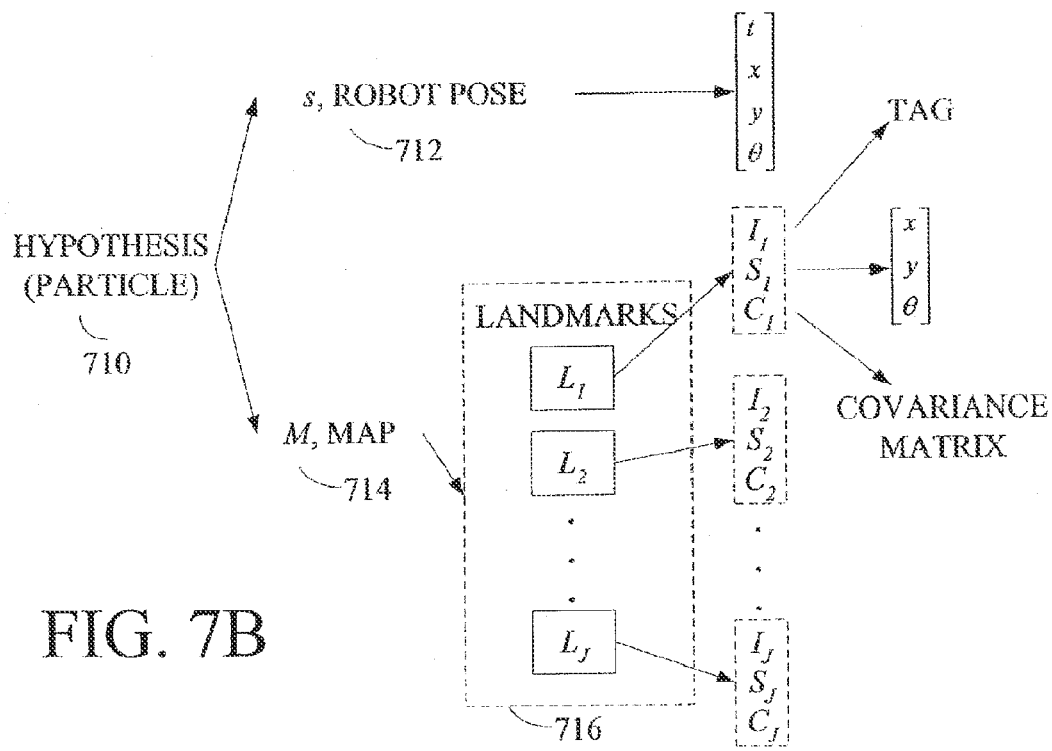
FIG. 7B illustrates one example of data associated with a hypothesis or particle.

The SLAM module 604 maintains one or more poses and maps 620. In one embodiment, the SLAM module 604 maintains multiple particles or hypotheses, and each particle is associated with a pose and a map. FIGS. 7A and 7B illustrate an example of relationships between particles, poses, and maps.

The SLAM module 604 receives the raw pose data 610 from the dead reckoning interface 618. It will be understood that the nature of the raw pose data 610 can vary according to the type of dead reckoning sensor 614 and the type of output specified by the dead reckoning interface 618. Examples of the raw pose data 610 can include distance measurements, velocity measurements, and acceleration measurements. The dead reckoning data is used by the SLAM module 604 to estimate course and distance traveled from a prior pose. It will be understood that where multiple hypotheses are used by the SLAM module 604, that the dead reckoning data is used to estimate course and distance traveled from relatively many prior poses.

Other inputs to the SLAM module 604 include visual localization data from the Visual Front End 602 and/or the optional Pre-Filter module 622. As a robot with VSLAM travels in an environment, the robot observes visual landmarks. When a new visual landmark is encountered, the SLAM module 604 can store the robot's global reference frame location for the particles in the SLAM database 608. For example, the robot's pose can be estimated from a previous location and the course and distance traveled from a last known pose.

When a previously created landmark is observed, the SLAM module 604 is provided with a new estimate of relative pose information, such as Δx, Δy, and Δθ to the observed landmark, from the Visual Front End 602 or the optional Pre-Filter module 622. The SLAM module 604 uses the change in pose information to update the one or more poses and maps 620 maintained. Accordingly, the visually observed landmarks can advantageously compensate for drift in dead reckoning measurements.

An example of a process for performing SLAM will be described in greater detail later in connection with FIG. 13.

Multiple-Hypothesis VSLAM

FIG. 7A illustrates multiple particles in a multiple-hypothesis VSLAM system 600. Multiple particles can advantageously be maintained by the SLAM module 604 such that multiple possible locations and maps can be maintained in a probabilistic manner. In the illustrated VSLAM system 600, a multi-particle approach is not used in the Visual Front End 602.

A collection of K particles 702 form the multiple hypotheses. The number of particles K in a collection can vary in a very broad range and can depend on a variety of parameters including environmental conditions, hardware configurations, available CPU resources, and the like. In one example, the number of particles K is about 200. Other usable values for the number of particles K will be readily determined by one of ordinary skill in the art. In one embodiment, the number of particles K varies adaptively according to at least one of the following: available CPU resources; a density of particles; the number of landmarks encountered; and the like.

In the illustrated architecture, each particle or hypothesis is associated with a pose and a map. In this manner, multiple hypothetical poses and multiple hypothetical maps are maintained. For example, a first particle 704 is associated with a first pose $s_1$ 706 and a first map $M_1$ 708. In one embodiment, particles that are associated with a relatively low probability of being correct are discarded, and new particles are introduced into the collection of K particles 702 by copying other particles. Perturbations, such as random perturbations, to the particle poses, which will be described later in connection with FIG. 13, permit copied particles to deviate from the original particles.

FIG. 7B illustrates one example of data associated with a hypothesis or particle 710. The hypothesis or particle 710 can be associated with a robot pose s 712 and a map M 714. The robot pose s 712 corresponds to the pose (location and orientation) of the robot as described earlier in connection with FIG. 4. In the illustrated format, the data for the robot pose s 712 is represented by a 4×1 column vector including a last update time t, an x-position x, a y-position y, and a heading θ. The last update time t can be used by the SLAM module 604 to reference appropriate data from the dead reckoning data to compute the distance and course traveled when updating the robot pose s 712. It will be understood that the robot pose s 712 can be stored in a variety of forms, such as in polar coordinates and in other vector or non-vector representations.

The map M 714 includes a collection of landmarks 716. In this context, it will be understood that "landmark" refers to data in the collection that is associated with a physical landmark in the environment. It should be noted that a physical landmark can correspond to one or more objects in the environment. The number of landmarks J in the collection 716 can vary in a very broad range. Initially upon startup, the number of landmarks J can correspond to zero and can grow as landmarks are observed by the robot in the environment. Of course, the number of landmarks J in the collection 716 can vary according to the density or clutter of identifiable landmarks in the environment and the size of the environment. For example, in a test using a fairly typical apartment as a test environment, the number of landmarks J in the collection 716 has been observed in the range of about 10 to about 100. In addition, the criteria applied to determine whether visual features can be reliably detected by the Visual Front End 602 can also affect the number of landmarks J stored in the collection 716.

In the illustrated structure, a landmark is associated with a landmark tag or identifier I, a landmark pose estimate S, and an uncertainty measure, such as, for example, a covariance matrix C. Information describing the visual characteristics or image of the landmark, such as 3-D features, can be stored in a collection of data associated with the Visual Front End 602, such as in the landmark database 606. In a collection of data for the SLAM module 604, such as the SLAM database 608, a cross reference or database record identifier can be used to identify the landmark tag I. An example of a data structure for the SLAM database 608 and methods for efficiently managing VSLAM databases will be described later in connection with FIG. 8.

It should be noted that the landmark pose S corresponds to the pose of the robot itself when the robot "creates" the landmark and adds the landmark to the map. In one embodiment, the landmark pose S can also be updated when the robot re-observes the landmark. In the illustrated structure, the landmark pose S corresponds to a 3×1 column vector with the contents of an x-dimension x for global reference, a y-dimension y for global reference, and a robot heading θ relative to the global reference frame. As noted earlier, the hypothetical pose and the corresponding map can advantageously vary among the particles of a multi-particle or multiple hypothesis SLAM system.

A covariance matrix C represents the uncertainty of the landmark pose S. The symbol $C_m^k$ will be used herein to denote the covariance matrix associated with landmark k for particle m. In one embodiment, the covariance matrix $C_m^k$ is updated with a Kalman filter as will be described in greater detail later in connection with FIG. 13.

Example of a Data Structure

Figure 8:
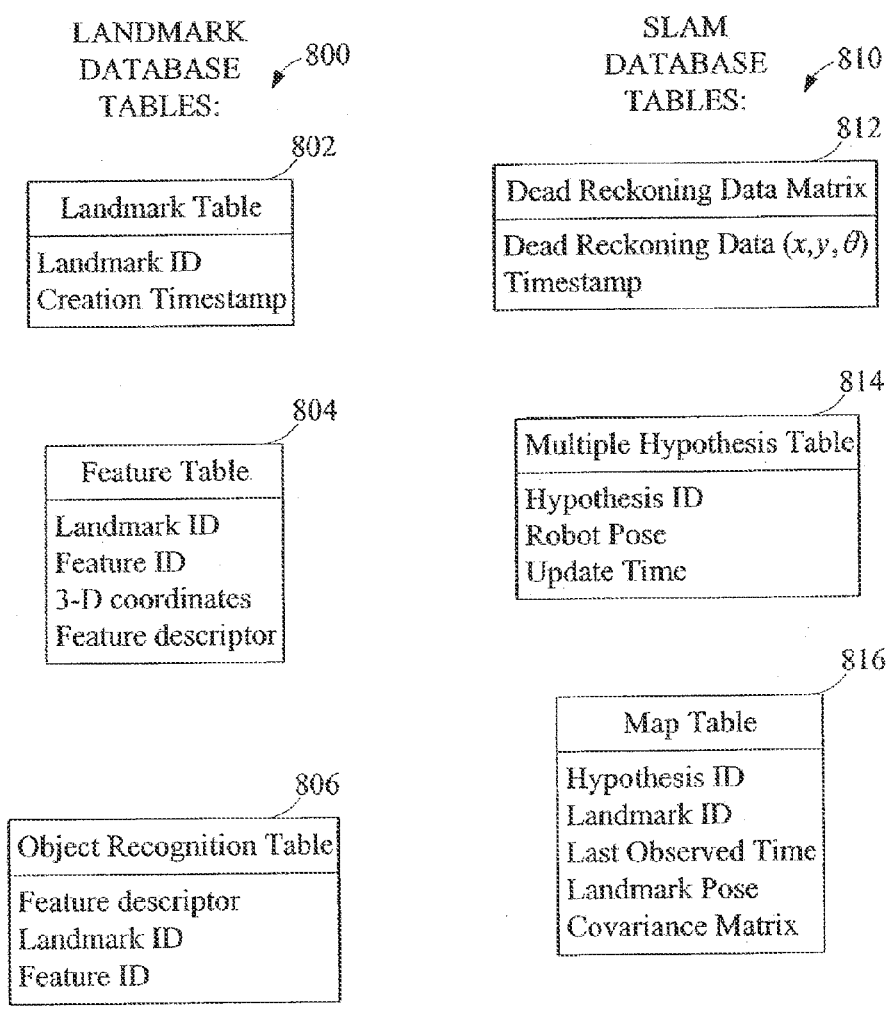
FIG. 8 illustrates one example of a data structure for a relational database that can be used with an embodiment of the invention to maintain data for a visual front end and for SLAM.

FIG. 8 illustrates one example of a data structure for a relational database that can be used with an embodiment of the invention to maintain data for visual localization and for SLAM.

It will be understood by one of ordinary skill in the art that a database can be implemented on an addressable storage medium and can be implemented using a variety of different types of addressable storage mediums. For example, the landmark database 606 and/or the SLAM database 608 can be entirely contained in a single device or can be spread over several devices, computers, or servers in a network. The landmark database 606 and/or SLAM database 608 can be implemented in such devices as memory chips, hard drives, optical drives, and the like. Though the data structure shown has the form of a relational database, one of ordinary skill in the art will recognize that the database may also be, by way of example, an object-oriented database, a hierarchical database, a lightweight directory access protocol (LDAP) directory, an object-oriented-relational database, and the like. The databases may conform to any database standard, or may even conform to a non-standard, private specification. The database can also be implemented utilizing any number of commercially available database products such as, by way of example, Oracle® from Oracle Corporation, SQL Server and Access from Microsoft Corporation, Sybase® from Sybase, Incorporated and the like.

The data structures shown utilize a relational database management system (RDBMS). In a RDBMS, the data is stored in the form of tables. Conceptually, data within the table is stored within fields, which are arranged into columns and rows. Each field contains one item of information. Each column within a table is identified by its column name and contains one type of information, such as a value for a SIFT feature. For clarity, column names are illustrated in the tables of FIG. 8.

A record, also known as a tuple, contains a collection of fields constituting a complete set of information. In one embodiment, the ordering of rows does not matter as the desired row can be identified by examination of the contents of the fields in at least one of the columns or by a combination of fields. Typically, a field with a unique identifier, such as an integer, is used to conveniently identify a related collection of fields.

By way of example, three tables are shown for a landmark database data structure 800, and three tables are shown for a SLAM database data structure 810. The exemplary data structures illustrate a convenient way to maintain data such that an embodiment using the data structures can efficiently store and retrieve the data therein. The tables for the landmark database data structure 800 include a Landmark Table 802, a Feature Table 804, and an optional Object Recognition Table 806.

The Landmark Table 802 stores data related to when a landmark was "created," that is, when a visual landmark was recognized as a "new" landmark and added to the landmark database 606. A Landmark ID field can be used to identify the appropriate field for a particular landmark. A Creation Timestamp field can be used to store an indication of when the landmark was observed by the robot and then added to the database. The Creation Timestamp field can be filled with a timestamp from, for example, a computer's operating system time. In one embodiment, the Landmark Table 802 is optional.

The Feature Table 804 stores data relating to the identification of a landmark and data useful for calculating a relative pose. For example, a landmark can be characterized by a plurality of 3-D features. The Feature Table 804 includes fields for a Landmark ID, a Feature JD for each 3-D feature stored, a Feature descriptor associated with each 3-D feature stored, the 3-D coordinates of each 3-D feature in the landmark reference frame, and optionally, the 2-D coordinates of the 2-D feature associated with each 3-D feature. The Landmark ID field can be used to identify the records that correspond to a particular landmark. A visual landmark is typically characterized by a number of 3-D features. Accordingly, the Feature ID field can be used to identify records that correspond to a particular feature of a landmark. The Landmark ID field for a record can be used to identify the particular landmark corresponding to the feature and be used to identify related records for other features of the landmark. The Feature descriptor field can be used to store visual information about the feature such that the feature can be readily identified upon a revisit of the landmark by the robot. The 3-D coordinate of feature field can be used to store the 3-D coordinates of the corresponding 3-D feature in the landmark reference frame. This provides a reference for projection calculations which are later used when calculating the relative pose when the landmark is re-encountered. For example, where a camera is used as the visual sensor, the 2-D image coordinates can include one or more pixel locations that correspond to the 3-D features.

The optional Object Recognition Table 806 includes the Feature descriptor field, the Landmark ID field, and the Feature ID field. The optional Object Recognition Table 806 can advantageously be indexed by the Feature descriptor, which can facilitate the matching of observed images to landmarks.

The tables for the SLAM database data structure 810 include the Dead Reckoning Data Matrix 812, a Multiple Hypothesis Table 814, and a Map Table 816. The Dead Reckoning Data Matrix 812 can include a field for dead reckoning data (x, y, θ) and a field for a timestamp. The information stored in the Dead Reckoning Data Matrix 812 can be used to estimate course and distance traveled from a previous point. In one embodiment, the Dead Reckoning Data Matrix 812 accumulates dead reckoning data on an ongoing basis. Although dead reckoning is typically relatively accurate over short distances, calibration errors, slippage, and the like can eventually accumulate in the dead reckoning data as illustrated by the second path 206 described earlier in connection with FIG. 2.

The Multiple Hypothesis Table 814 includes a Hypothesis ID field, which serves as an identifier for a hypothesis or particle in a multi-hypothesis SLAM system. A robot pose field stores the robot pose (x, y, θ), and an update time field stores a time corresponding to the last update time (t) for the particle. In one vector representation, which will be described later, the pose S includes both the pose (x, y, θ) and the last update time (t).

The Map Table 816 includes a Hypothesis ID field that identifies the hypothesis to which a particular map belongs. As described earlier in connection with FIG. 7B, a map includes one or more landmarks. A Landmark ID field identifies which records in the map table correspond to a particular landmark. In one embodiment, the same value for the Landmark ID field is used in the Landmark Table 802, in the Feature Table 804, and in the Map Table 816 for a particular landmark, but it will be understood by one of ordinary skill in the art that such identifying values can be also translated or cross referenced across disparate identifiers. A Last Observed Time field can store a timestamp that indicates the last time that the corresponding landmark information was updated. A Landmark Pose field stores a globally-referenced robot pose corresponding to when the Landmark was "created" or added, or updated to the database. It should be noted that the Landmark Pose for the "creation" pose can also be updated or refined as further measurements are made by the robot. A covariance field stores data for a covariance matrix associated with the landmark. In one embodiment, the covariance matrix is updated by a Kalman filter as will be described later in connection with FIG. 13.

The following initialization parameters can be used for the VSLAM system when the robot is started or reset or when the VSLAM system is reset. For example, when the robot is first powered up, the following initialization parameters can be used. With respect to the landmark database 606, the Landmark Table 802 and the Feature Table 804 can be initialized to be empty or cleared. With respect to the SLAM database 608, the Dead Reckoning Data Matrix 812 can be initialized such that x=0, y=0, θ=0, and such that the timestamp field corresponds to the current time for the robot. Where implemented in a personal computer, such as a laptop computer, the current time can typically be retrieved from the operating system.

Each hypothesis in the Multiple Hypothesis Table 814 can be initialized by setting a particle's pose to x=0, y=0, θ=0, and by setting the update time field for each particle to the current time. For initialization, the Map Table 816 can be cleared.

Management of Databases

It will be understood by the skilled practitioner that the size of the databases holding the various maps for the particles can grow over time as landmarks are accumulated in the maps. One embodiment of the invention also include techniques for managing the databases.

The landmark database 606 and the SLAM database 608 can be managed to provide efficient performance of VSLAM processing in a diverse variety of settings and to manage the amount of memory used in VSLAM processing. One way to efficiently manage the databases is to remove landmarks from the databases that are perceived to be no longer present in the environment or can otherwise be considered unreliable, bad, or in any other way undesired.

For example, the assessment that a physical landmark has disappeared from the environment such that the corresponding landmark should be removed from the databases can be based on repeatedly not observing the physical landmark at or near poses where it is expected to be observed.

In another example, measurements that repetitively correspond to outliers, i.e., relatively extreme measurements, can also be considered to be unreliable and can be removed from the databases. For example, a landmark can be considered to be unreliable or bad if measurements of the landmark over time have been repeatedly inconsistent or otherwise indicated as unreliable. An example of a range for repeatedly inconsistent measurements is about 5 to 10 inconsistent measurements. Other appropriate values will be readily determined by one of ordinary skill in the art. In one embodiment, a measurement for a landmark is inconsistent if the measurement suggests that the robot is located relatively far away front where a relatively large proportion of the particles, such as about 90%, the SLAM subsystem predicts the robot to be. In one embodiment, the robot is determined to be located relatively far away when the SLAM prediction prior to incorporation of the new visual measurement into an estimate falls outside a 95% confidence ellipse. In one embodiment, the 95% confidence ellipse has (i) the visual measurement estimate of robot pose as its mean, and (ii) $C_{sensor}$ as its covariance matrix. In another embodiment, the robot can be determined to be located relatively far away when the difference between the pose estimated by SLAM and the pose estimated by the visual measurement exceed a predetermined threshold. An example of an appropriate value for a predetermined threshold in an indoor environment is about 2 meters. Other values will be readily determined by one of ordinary skill in the art. It should be noted that while "repeatedly inconsistent" measurements for a landmark can indicate that the landmark is unreliable, an occasionally inconsistent measurement may or may not indicate that the landmark is unreliable, but rather, such occasionally inconsistent measurements may be the result of collisions of the robot with another object, a "kidnapping" of the robot, such as by lifting and moving the robot from one spot to another, and the like. In one embodiment, such occasionally inconsistent measurements do not result in a deletion of the landmark from the databases.

In another example, landmarks can be considered undesirable when, for example, it is determined that the density of landmarks in some parts of the map is relatively high, such as about 5-10 landmarks per square meter for an indoor environment. It will be understood that the density of landmarks can vary considerably from one environment to another and that correspondingly, appropriate thresholds for "high" density will also vary and will be readily determined by the skilled practitioner. By selectively removing some of the landmarks in a too dense portion of the map, memory can be freed for other tasks.

In one embodiment, a memory management technique can be used when the landmark database has grown to a relatively large size. Typically, a mass storage device such as a hard disk is relatively slow compared to a solid-state memory device, such as random access memory (RAM). Conversely, a mass-storage device typically has much more storage capacity than a solid-state memory device. Alternatively, a solid-state memory device, such as, for example, a flash memory or an EEPROM device, can be used to store a landmark database in a non-volatile manner. Memory usage can be efficiently managed by maintaining only a relatively small fraction of the total landmark database in the relatively fast memory, such as the RAM, at a time. For example, a few initial landmark measurements and comparisons with the landmark database can typically reveal approximately where the robot is likely to be operating in a mapped environment. For example, an entire house, office, or hospital floor can be mapped as the environment; and after a few initial measurements, the VSLAM system 600 can determine that the robot is in a particular room in a house, on the first floor of an office, in a particular wing of a hospital, and the like.

To reduce the consumption of memory resources, at least partly in response to the determination of the approximate location of the robot, the VSLAM system 600 can then maintain a relatively small subset of the database in RAM that contains the relevant portion of the database, and other previously used memory resources can be released back to the system. Should, for example, a relatively long period of time transpire without successful matches with the loaded subset of the database, the entire map can again be loaded temporarily to determine if the robot has been moved or has moved to another part of the environment. For example, the robot may have traveled autonomously or may have been picked up and moved to a new location.

In one embodiment, the subset of the map that is maintained in relatively fast memory such as RAM can at least temporarily correspond to a randomly selected subset of the plurality of landmarks from the map. In another embodiment, the subset of the map that is maintained in relatively fast memory can at least temporarily correspond to a subset that is selected such that the density of landmarks remaining in the subset is relatively uniformly distributed throughout the map. These techniques can advantageously be used, for example, to assist a mobile robot with relatively limited memory resources and/or computational resources to localize itself within one or more maps.

In one embodiment, the VSLAM system advantageously discontinues adding new landmarks to the database. In one example, the VSLAM system discontinues landmark creation in a portion of an environment or in the entire environment at least partly in response to a determination that the landmark density has exceeded a predetermined threshold, such as 5-10 landmarks per square meter. For example, when a database for an environment exhibits relatively high landmark density in one portion of the environment and a relatively low landmark density in another portion of the environment, the addition of new landmarks to the database can be disabled for the portion of the environment corresponding to the relatively high landmark density in the database, and the addition of new landmarks can be enabled for portions of the environment corresponding to the relatively low landmark density.

In one embodiment, the VSLAM system discontinues adding new landmarks to the database at least partly in response to a landmark creation decay rate, i.e., a determination that over a period of time, fewer and fewer new landmarks are being identified. The measurement of the landmark creation decay rate can be applied to parts of an environment or to the entire environment. For example, in a relatively static environment under relatively constant lighting conditions, the rate at which landmarks are created will typically be highest in the beginning, before many landmarks have been created. After the area has been partially mapped by the creation of landmarks, i.e., the addition of landmarks to the database, the visual front end less frequently attempts to create landmarks. In one embodiment, a creation rate corresponds to the number of landmarks created per meter of travel. When the creation rate in a given part of the environment has dropped below a threshold, which can correspond to for example, (i) a predetermined value such as 1 landmark every 10 meters, or can correspond to (ii) a percentage of the initial creation rate such as 5% of the rate (per unit of distance traveled) obtained during the first passage through the relevant part of the environment, then landmark creation can be temporarily discontinued in that part of the environment.

In another embodiment, the VSLAM system discontinues adding new landmarks to the database for all or part of the environment at least partly in response to a ratio of visual measurements to landmarks created. In another embodiment, the discontinuing of adding landmarks can also be triggered at least partly in response to elapsed time, such as after 30 minutes of mapping, or at least partly in response to memory usage, such as when 75% of the memory has been used for the landmark database.

Visual Processing in a Visual Front End

Various processes will now be described. Processes used when revisiting previously detected landmarks will first be described. Processes used when adding newly detected landmarks to the database will then be described. These processes can be used to build a map autonomously. These processes can be used to refine existing maps and to localize the robot within one or more maps.

Figure 9:
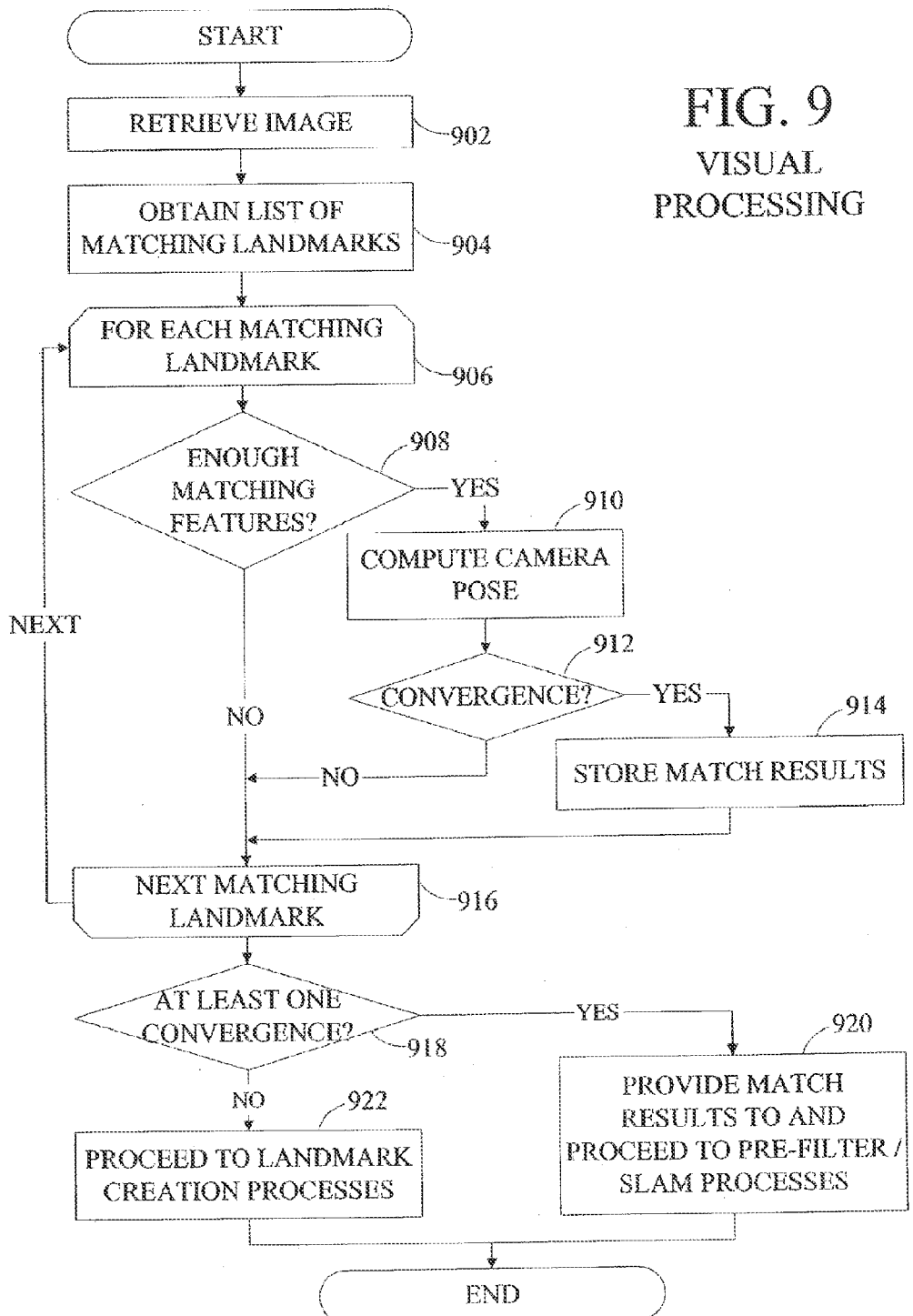
FIG. 9 is a flowchart that generally illustrates a process useful in a visual front end for visual processing.

FIG. 9 is a flowchart that generally illustrates a process that can be used in a visual front end for visual processing. As a robot with VSLAM moves in an environment, the robot analyzes the physical landmarks that it observes. Recognized landmarks can be used to localize the robot within one or more maps. Newly-created landmarks can be added to one or more maps. The act of creating a new landmark may also be referred to as "generating" a landmark. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 902, where the process retrieves an image from the visual sensor or applicable data buffer. At this point in the process, multiple viewpoints are not used. For example, where the visual sensor for the robot corresponds to multiple cameras, one image from the camera can be selected for analysis. It will be understood that the image can also be related to a timestamp, which can permit other processes to reference appropriate data from the dead reckoning sensors to the image. The process advances from the state 902 to a state 904.

In the state 904, the process generates a list of matching landmarks. For example, the process can extract feature descriptors from the image, such as SIFT feature vectors, and compare the extracted features to features for landmarks that had previously been observed and stored. For example, features for landmarks can be stored in the landmark database 606. In one embodiment, the optional Object Recognition Table 806 is used for relatively fast searching of feature descriptors. In one embodiment, the landmarks with one or more matching landmarks are identified by a list, such as a list of landmark identifiers, for further analysis. The process advances from the state 904 to the beginning of a loop 906.

The loop further compares the features of the matching landmarks identified by the list to features of the observed image. It will be understood that where no matching landmarks are identified in the state 904, the process can skip the execution of the loop and proceed to the end of the loop 916.

For each matching landmark, the loop begins at a decision block 908. In the decision block 908, the process compares the number of features that match between the image and the matching landmark. The process uses the detected features to estimate a relative pose to the landmark. In one embodiment, the number of features detected is compared to a predetermined number corresponding to the minimum number of features needed to solve the structure and motion problem. It will be understood that the minimum number of features can depend on the technique used to solve the structure and motion problem. For example, where the structure and motion problem is resolved using the trifocal tensor method, the minimum number of features for convergence of a solution is about 5. The process proceeds from the decision block 908 to a state 910 when there are enough matching features for the landmark. Otherwise, the process proceeds to the end of the loop 916 to return to process further landmarks or to exit out of the loop.

In the state 910, the process computes the camera pose of the robot with respect to the landmark reference frame. The camera pose corresponds to the relative pose, such as $\Delta x$, $\Delta y$, and $\Delta \theta$, between the pose corresponding to the image retrieved in the state 902 and the landmark pose for the matched landmark. It will be understood that the relative pose computation can include further dimensions, such as a change in vertical component ($\Delta z$), toll, and pitch, and that the relative pose can also be represented in other coordinate system forms.

An example of the relative pose was described earlier in connection with FIGS. 5B, 5C, and 5D. The skilled practitioner will appreciate that many techniques can be used to compute the relative pose. One computationally-efficient technique to compute the relative pose is to calculate the relative pose that results in a relatively small projection error, such as the minimum projection error.

In one embodiment, the process retrieves the 3-D coordinates for the features of the landmark from a data store, such as from the Feature Table 804 of the landmark database 606. From the 3-D coordinates, the process shifts a hypothetical pose (relative to the landmark pose) and calculates new 2-D image coordinates by projection from the 3-D coordinates and the change in pose. In one embodiment, the relative pose is determined by searching in a six-dimensional 3-D pose space, such as, for example, x, y, z, roll, pitch, and yaw ($\theta$) for a point with a relatively small root mean square (RMS) projection error between the presentlymeasured feature coordinates and the projected coordinates from the 3-D feature to the image. The process advances from the state 910 to a decision block 912.

Iterative computations for finding numerical solutions can be used to compute the relative pose. It should be noted that such techniques do not always converge to a result. When convergence is achieved, that is, the landmark match is relatively good, the process proceeds from the decision block 912 to a state 914 to store information relating to the matched landmark. Otherwise, the process proceeds from the decision block 912 to the end of the loop 916. Of course, it will be understood that other techniques, such as relatively computationally inefficient brute force techniques, can also be used to calculate a relative pose with a relatively small projection error.

In the state 914, the process stores results relating to the matched landmark such that the results can be provided to a pre-filtering process and/or directly to SLAM processes. In one embodiment, the match results for a landmark include the landmark identifier for the evaluated landmark, the calculated camera pose, a root mean square (RMS) value of the projection error for the calculated camera pose, the number of matching features, and a computation of slope. In one embodiment, the storing of one or more of the computation of the RMS value of the projection error, the number of matching features, and the computation of slope is optional and is provided when one or more of these metrics are used by pre-filtering processes, which will be described in greater detail later in connection with FIG. 12. The process can store these metrics such that later re-computation of one or more of the results can advantageously be avoided. The process advances from the state 914 to the end of the loop 916, where the process returns to the beginning of the loop 906 to process further matching landmarks or proceeds to a decision block 918 when done with processing matching landmarks.

In the decision block 918, the process determines whether there has been at least one converging solution to solving for the relative pose or camera pose, e.g., $\Delta x$, $\Delta y$, and $\Delta \theta$. For example, in one embodiment, the process determines whether there has been at least one converging solution when the process had proceeded from the decision block 912 to the state 914 for at least one of the landmarks that were identified to be matching.

When there has been at least one convergence, this indicates that there has been at least one relatively "good" match between what was observed by the robot and at least one of the landmarks in the database, and the process proceeds from the decision block 918 to a state 920. Otherwise, the process proceeds from the decision block 918 to a state 922.

In the state 920, the process provides the match results previously stored in the state 914 to Pre-Filtering processes and/or to SLAM processes such that the matched landmarks can be used to localize the robot within the global reference frame. Advantageously, this information can be used by a SLAM process to correct for drift in the dead reckoning information. The match results can include match results for one or more landmarks. When a plurality of landmarks are identified in a single image, one embodiment of the SLAM process can process all of the plurality as will be described later in connection with FIG. 13.

Returning now to the state 922, at this point in the process, the process has determined that there are no relatively "good" matches between what was observed by the robot and the landmarks in the database, and the process proceeds to landmark creation processes, such as the process that will be described in greater detail later in connection with FIG. 10.

Visual Front End Processing for Landmark Creation (New Landmarks)

Figure 10:
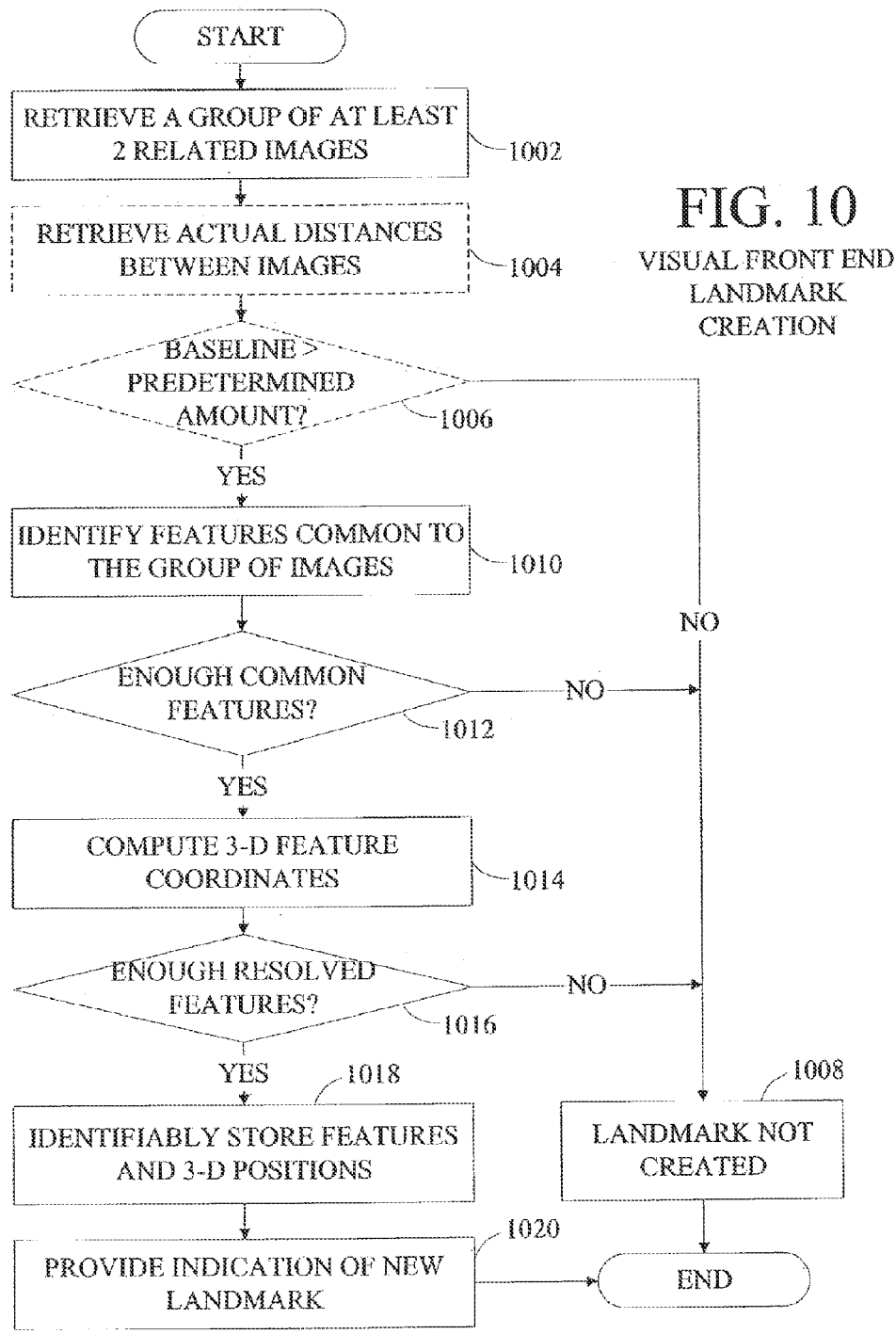
FIG. 10 is a flowchart that generally illustrates a process useful in a visual front end for creating a new landmark.

FIG. 10 is a flowchart that generally illustrates a process that can be used in a visual front end when recognizing a new physical landmark in the environment and creating a corresponding landmark in one or more maps in a database. The act of creating a new landmark may also be referred to as "generating" a landmark. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 1002, where the process retrieves a group of at least 2 images for analysis. For example, the images can be provided by an visual sensor with multiple images, such as a binocular or trinocular camera, or by a visual sensor with a single imager, such as from a single camera. When images from a single camera are used, the process can select images that are appropriately spaced apart. In the illustrated embodiment, the robot is equipped with a single forward-looking camera and travels forward to take related images. Other configurations for the visual sensor are also possible. In other examples, the visual sensor can correspond to a generally upward-pointing camera, to a sideways-looking camera, or to positions between forward looking, upward, and/or sideways. Returning now to the illustrated embodiment with a single forward-looking camera, in one example, three images are selected at a separation distance of at least about 10 centimeters (cm) apart. It will be understood that an appropriate distance for the separation distance can vary in a broad range depending on the environment. For example, where the operating environment corresponds to a relatively expansive environment, such as to an outdoor environment, the appropriate distance for separation between images can be higher in order to gain perspective on the features. In one embodiment, the separation distance can be adaptively varied in response to an estimate of the proximity of obstacles that can obstruct the motion of the robot. In one embodiment, where the robot is equipped with a single forward-looking camera, the robot moves in an approximately straight line in the forward direction while taking the images. Although some turning can be tolerated while the robot is taking images, the turning should not be so excessive such that the features of the landmarks are no longer in the view of the camera. The process advances from the state 1002 to an optional state 1004.

The state 1004 and a decision black 1006 can be optional depending on the configuration of the robot. Where the robot is equipped with a visual sensor with multiple imagers, such as a trinocular camera, the state 1004 and the decision block 1006 can be skipped, and the spacing between the visual sensors can be retrieved from a stored parameter in memory. When skipped, the process advances from the state 1002 to a state 1010.

When a single camera is used as the visual sensor, and the robot moves to take different images from different perspectives, the process retrieves the actual distances between images in the state 1004 and checks the amount of movement in the decision block 1006. In one embodiment, these distances are determined by monitoring the dead reckoning data corresponding to the times at which the images were taken. The process advances from the state 1004 to the decision block 1006.

In the decision block 1006, the process tests the distance traveled between images, termed "baseline." For example, the amount of baseline between images can be compared to a predetermined value. It will be understood that the predetermined value can vary in a very broad range. In an indoor environment, such as the interior of a home or apartment, an appropriate value can be about 10 centimeters for the predetermined value. Of course, the appropriate value can depend on the environment, and other appropriate values will be readily determined by one of ordinary skill in the art. When the movement of the robot is not sufficient between one or more of the images in the group, the process proceeds to a state 1008, and the process does not create a landmark. Otherwise, the process proceeds from the decision block to the state 1010.

In the state 1010, the process analyzes the selected images to identify 2-D features that are common to the images in the group. The number of features that are observable will vary according to the environment. The extraction of suitable features has been extensively described in the literature. SIFT features are one example of such 2-D features. See, for example, David G. Lowe, *Local Feature View Clustering for 3D Object Recognition* Proceedings of the IEEE Conference on Computer Vision and Pattern Recognition, Kauai, Hi. (December 2001). It should be noted that other information used in the calculation of the features can include intrinsic camera calibration parameters and extrinsic camera parameters. Examples of intrinsic camera calibration parameters include optical center, distortion parameters, and focal length. Examples of extrinsic camera calibration parameters include a camera-rigid transformation between the camera reference frame and the local reference frame. The process advances from the state 1010 to a decision block 1012.

In the decision block 1012, the process determines whether enough features have been identified that are common to the images in the group, e.g., the three images, for reliable identification of the landmark. When, for example, the process determines that fewer than a predetermined number of features are common to the images in the group, the process can determine that there are not enough features detected to reliably identify the landmark in the future. In this case, the process can proceed from the decision block 1012 to the state 1008, and the process does not "create" a landmark. It will be understood that an appropriate value for the predetermined number of features can vary in a very broad range and can depend on the method used to identify visual features. In one embodiment, the predetermined number of features is higher for the decision block 1012 for landmark creation than a predetermined value used to compare an image to an already stored landmark as described earlier in connection with the decision block 908 of FIG. 9.

In one embodiment, where SIFT features are used, an example of a sample value for the predetermined number of features is about 10. Other suitable values will be readily determined by one of ordinary skill in the art. In one embodiment, the VSLAM system 600 can be configured to permit predetermined values to be user configurable. The process proceeds from the decision block 1012 to a state 1014 when enough features common to the images in the group have been identified.

In the state 1014, the process computes 3-D local reference frame positions or displacements to the common features identified in the state 1010. In one embodiment, the 3-D local reference frame positions correspond to the approximate 3-D position (x, y, z) of a feature relative to the visual sensor of the robot. Where multiple images are taken from a single visual sensor as the robot moves, the 3-D local reference frame positions can be relative to the position of the robot when the robot took one of the images in the group, such as the first image in the group. In one example, the computations for the 3-D positions are resolved by solving the structure and motion problem using the trifocal tensor method. It will be understood that the features can occupy a space larger than a point, such that the corresponding 3-D positions can be relatively approximate. The process advances from the state 1014 to a decision block 1016.

In the decision block 1016, the process determines whether there have been enough 3-D local reference frame positions for features resolved in the state 1014 for the landmark to be reliably recognized. It will be understood that occasionally, the process may not find a solution to the 3-D local reference frame positions for a particular feature such that the number of 3-D features with corresponding displacement information can be different than the number of such initially-detected features. For example, in the decision block 1016, the process can compare a count of the 3-D local reference frame positions resolved for features of a landmark to a predetermined number. In one embodiment, where SIFT features are used, the process determines that a landmark has a sufficient number of features with 3-D local reference frame positions resolved for relatively reliable recognition when there have been 10 or more such features resolved. Other appropriate values will be readily determined by one of ordinary skill in the art. The process proceeds from the decision block 1016 to a state 1018 when the landmark has been determined to be reliably recognized. Otherwise, the process proceeds from the decision block 1016 to the state 1008, and the process does not "create" a landmark.

In the state 1018, the process identifiably stores the features, the 3-D positions, and, optionally, the approximate 2-D image locations corresponding to the features for the image that is used as the reference. For example, the 3-D position and the 2-D image location for a feature can be stored in a record in the Feature Table 804 described earlier in connection with FIG. 8. It will be understood that each landmark that is created should have a unique reference, such as a unique numbered identifier, and that each feature of a reference should also be identifiable, such as by a combination of the reference for the landmark, e.g., Landmark ID, and the reference for the feature, e.g., Feature ID. The process advances from the state 1018 to a state 1020.

In the state 1020, the process provides an indication that a new landmark has been created to other processes, such as processes related to the SLAM portion of VSLAM. An example of a SLAM process for creation of a landmark will be described later in connection with FIG. 11. For example, the indication can be provided as a parameter or flag in a software call, a hardware or a software interrupt, and the like. The indication can also be accompanied by the landmark identifier for the newly created landmark.

SLAM Processing for New Landmarks

Figure 11:
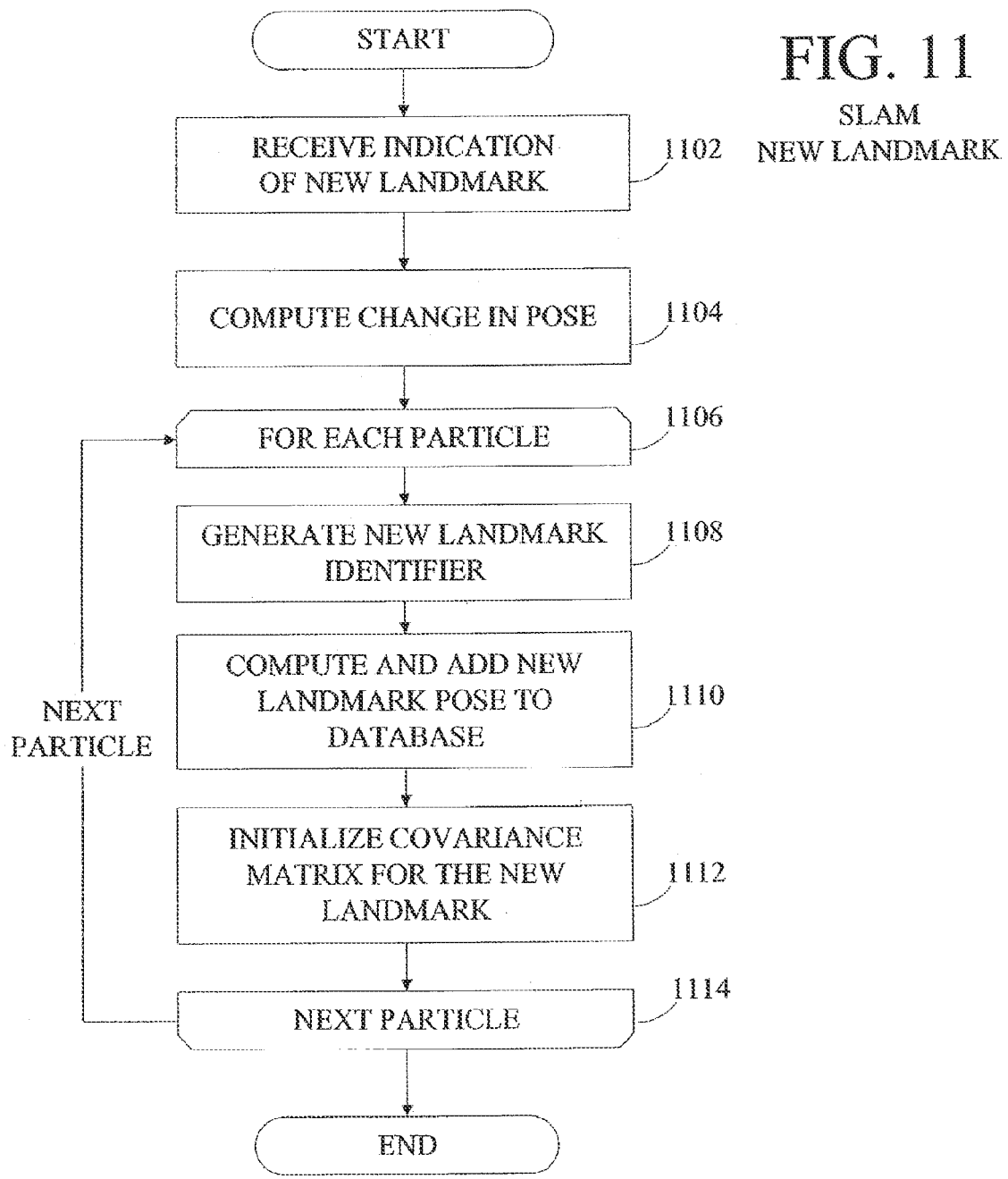
FIG. 11 is a flowchart that generally illustrates a process useful in a SLAM module for creating a new landmark.

FIG. 11 is a flowchart that generally illustrates a process that can be used in a SLAM module when creating a new visual landmark. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like. A process that can be used in a SLAM module when returning to an existing landmark will be described later in connection with FIG. 13. In a SLAM module, a landmark is represented by the pose of the landmark reference frame in the global reference frame, i.e., the transformation (rotation and translation) that relates the landmark reference frame to the global reference frame.

Returning to the process illustrated in FIG. 11, the process begins at a state 1102, where the process receives an indication that a new landmark has been observed. For example, the process can receive the indication of the new landmark and a corresponding identifier for the new landmark from the state 1020 of the process described earlier in connection with FIG. 10. The process advances from the state 1102 to a state 1104.

In the state 1104, the process computes the change in pose from a last update time for the SLAM system. In one embodiment, all the particles of a SLAM system are updated at the same time such that the last update time for a particular particle is the same as the last update time for the other particles.

The change in pose is computed by retrieving data provided by the dead reckoning sensors and/or interface. In one embodiment, the process retrieves the appropriate data from a data store, such as from a database including the Dead Reckoning Data Matrix 812 described earlier in connection with FIG. 8. For example, a timestamp associated with the last update time for the particles and a timestamp associated with the recognition of the observed landmark can be used to identify the appropriate data to be retrieved from the Dead Reckoning Data Matrix 812. In one embodiment, the process computes a change in pose $[\Delta_1, \Delta_2, \Delta_3]^T$ from the dead reckoning data, the results of which will be used later to estimate or predict the pose of a robot in the global reference frame and/or update the landmark pose.

$$\Delta^{odom} = \begin{bmatrix} \Delta_1^{odom} \\ \Delta_2^{odom} \\ \Delta_3^{odom} \end{bmatrix} = \begin{bmatrix} \sqrt{(y_l - y_k)^2 + (x_l - x_k)^2} \\ \left[\left(\arctan\left(\frac{y_l - y_k}{x_l - x_k}\right) - \theta_l + \pi\right) \bmod 2\pi\right] - \pi \\ [(\theta_l - \theta_k + \pi) \bmod 2\pi] - \pi \end{bmatrix} \quad \text{Equation 1}$$

In Equation 1, the change in pose from a first dead reckoning pose at time k $(x_k, y_k, \theta_k)$ to a second dead reckoning pose at time l $(x_l, y_l, \theta_l)$ is computed. In one embodiment, the change in pose is computed by a function call, such as a call to a "DeltaPose" subroutine. A variable $\Delta_1^{odom}$ corresponds to the Euclidean distance between $(x_k, y_k)$ and $(x_l, y_l)$. A variable $\Delta_2^{odom}$ corresponds to the bearing from the robot at time k to the robot at time l. A variable $\Delta_3^{odom}$ represents the change in heading from the robot at time k to the robot at time l. The "mod" denotes the arithmetic modulus operator. The process advances from the state 1104 to the beginning of a loop 1106.

Where multiple particles are used to track multiple hypothesis, the loop updates each particle that is maintained. The loop starts at a state 1108. In the state 1108, the process retrieves the landmark identifier for the newly defined landmark. In one embodiment, the same landmark identifier is used to identify a landmark in a SLAM process as the identifier for the landmark in a visual localization process. Of course, a different landmark identifier can also be generated and cross-referenced. It should also be noted that the SLAM process does not need to store graphical information, such as 3-D features, of the landmark. Rather, the SLAM process can operate by identification of which landmark was encountered, such as the Landmark ID, such that a database record identifier can be used to identify the landmarks within SLAM. The process advances from the state 1108 to a state 1110.

In the state 1110, the process adds the new landmark pose to the database. It should be noted that in the illustrated embodiment, the initial estimate of the new landmark pose is the estimated pose of the robot corresponding to when the landmark was observed that is stored in the database and not the estimated position in space of the physical landmark itself. To add the new landmark pose to the database, the process estimates the current pose of the robot for the particle corresponding to the particular iteration of the loop. In one embodiment, the current pose is estimated by combining the change in pose from the dead reckoning data as calculated in the state 1104 with the previous pose of the robot for the particle as retrieved from the last time that the particle was updated. Equation 2 expresses one way to combine the change in pose $[\Delta_1^{odom}, \Delta_2^{odom}, \Delta_3^{odom}]^T$ with a previous pose $(x_k, y_k, \theta_k)$ to generate a new pose $(x_l, y_l, \theta_l)$, which is used as the new landmark pose. It will be understood that the subscripts of k and l as used in the state 1110 represent different variables than the same subscripts of k and l as used in the state 1104.

$$\begin{bmatrix} x_l \\ y_l \\ \theta_l \end{bmatrix} = \begin{bmatrix} x_k + \Delta_1^{odom}\cos(\theta_k + \Delta_2^{odom}) \\ y_k + \Delta_1^{odom}\sin(\theta_k + \Delta_2^{odom}) \\ [(\theta_k + \Delta_3^{odom} + \pi) \bmod 2\pi] - \pi \end{bmatrix} \quad \text{Equation 2}$$

In one embodiment, the new robot pose $(x_l, y_l, \theta_l)$ is computed by a function call, such as a call to a "PredictPose" subroutine. The process advances from the state 1110 to a state 1112.

In the state 1112, the process initializes the landmark covariance matrix $C_m^k$ associated with the particle corresponding to the iteration of the loop, where m is a particle loop variable and where k is a landmark loop variable. In one embodiment, the landmark covariance matrix $C_m^k$ is initialized to a diagonal matrix 3×3 matrix. In one embodiment, the landmark covariance matrix $C_m^k$ is initialized to a diagonal matrix of diag(81 cm², 81 cm², 0.076 rad²). Other suitable initialization values for the landmark covariance matrix $C_m^k$ will be readily determined by one of ordinary skill in the art. The values for the landmark covariance matrix $C_m^k$ can be stored in a record in the Map Table 816. It will be understood that appropriate initialization values can vary in a very broad range and can depend on a variety of factors, including camera specification, dead reckoning equipment precision, and the like. The process proceeds from the state 1112 to the end of the loop 1114. The process returns to the beginning of the loop 1106 when there are remaining particles to be updated. Otherwise, the process ends.

Pre-Filtering Process

Figure 12:
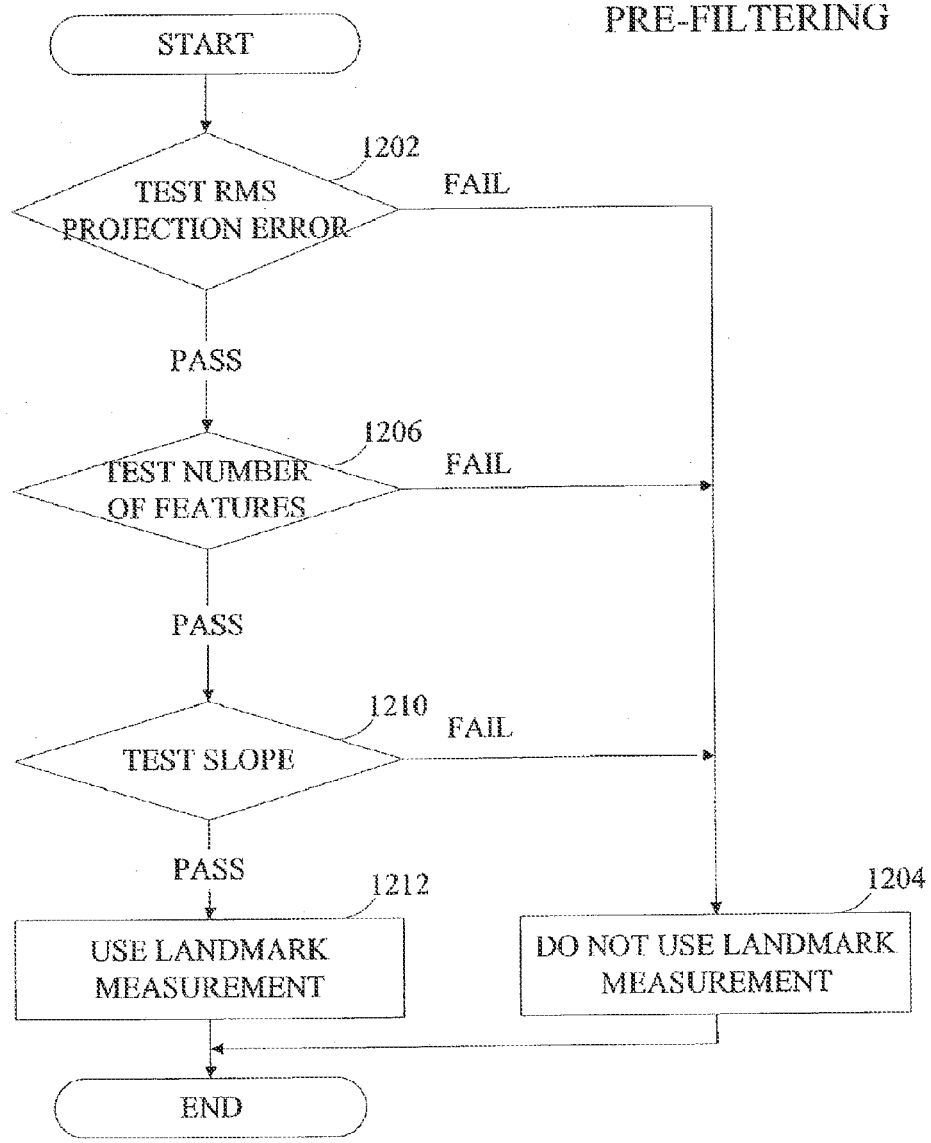
FIG. 12 is a flowchart that generally illustrates a process useful in a pre-filter for removing outliers.

FIG. 12 is a flowchart that generally illustrates a process that can be used in a pre-filter of a VSLAM system to remove outliers. In one embodiment, the Pre-Filtering process is optional. The Pre-Filtering process can advantageously be configured to prevent a SLAM module from receiving unreliable measurements of landmarks that may or may not have been unreliably identified. This can advantageously enhance the stability and robustness of VSLAM. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

In the illustrated process, three tests are used to establish the reliability of an observed landmark. It will be understood that in another embodiment, fewer tests can be used or other tests can be added. In one embodiment, the tests are based on data or metrics computed by the Visual Front End 602, and the processing for the pre-filter is performed in the Pre-Filter module 622. This data can be provided in a list of matching landmarks as described earlier in connection with the state 920 of the process of FIG. 9. When more than one visual measurement is provided in a list, the Pre-Filtering process can be repeated to process each visual measurement in the list. The change in pose is relative to the pose that the robot had when the landmark was created.

The process starts at a decision block 1202, where the process evaluates the level of the RMS projection error encountered when computing the landmark pose, e.g., $\Delta x$, $\Delta y$, and $\Delta \theta$, relative to the robot. In one embodiment, the relative pose is estimated by searching in a six-dimensional 3-D pose space for a pose with a relatively small RMS projection error as described earlier in connection with the state 910 of FIG. 9. Advantageously, the RMS projection error does not have to be recomputed by the pre-filter process. In one embodiment using a camera as the visual sensor, when the RMS projection error is less than about 3 pixels, the test for RMS projection error is considered passed. The process proceeds from the decision block 1202 to a decision block 1206 when the test is passed. Otherwise, when the test has not passed, the process proceeds from the decision block 1202 to a state 1204.

In the state 1204, the measurement of the observed landmark is considered to be unreliable, and the process does not use the computed landmark measurement for updating the robot pose and the map in SLAM. In one embodiment, this is accomplished by not executing a SLAM process for relative measurements computed in the visual front end or by not informing the SLAM module that a previously defined landmark has been re-encountered. In one embodiment, the Pre-Filtering process effectively ignores measurements that did not pass one or more tests from the list of landmark measurements provided by the state 920 of FIG. 9. The process then proceeds from the state 1204 to end and can be repeated as desired for other landmark measurements that have been computed.

Returning now to the decision block 1206, at this point in the process, the landmark measurement has passed the RMS projection error test (where used). In the decision block 1206, the process analyzes the number of features for the image that favorably compared with the features of the landmark. In one embodiment, the process compares the number to a predetermined threshold. Appropriate values for the predetermined threshold can vary in a very broad range.

In one example, when the number of matching features is at least 10, the landmark measurement has passed the test for the number of features. The process proceeds from the decision block 1206 to a decision block 1210 when the landmark measurement passes the test. The process proceeds from the decision block 1206 to the state 1204 and does not use the potentially unreliable landmark measurement when the landmark does not pass the test.

In the decision block 1210, the process compares the calculated slope for the floor to a predetermined value as a test for reliability. The change in pose that is calculated for the robot can include multiple dimensions, such as the six-dimensions of x, y, z, roll, pitch, and yaw. It should be noted that robots come in a variety of shapes and forms. Many land-based robots can travel horizontally along a floor, but are not configured to raise up or down in the vertical dimension z. In addition, many environments are relatively flat, such that the presence or absence of a sloping floor can be used as an indicator of the reliability of the detection of a landmark. The slope can be computed by, for example, dividing the value calculated for the vertical dimension ($\Delta z$) by a change in horizontal dimension, such as Euclidean distance traversed along the floor. An example of such a calculation is expressed in Equation 3.

$$\text{slope} = \left| \frac{\Delta z}{\sqrt{(\Delta x)^2 + (\Delta y)^2}} \right| \qquad \text{Equation 3}$$

In one embodiment, when the magnitude of the calculated slope is less than about 0.1, the test is a pass. Other appropriate values will be readily determined by one of ordinary skill in the art. In one embodiment, the testing of the slope can be enabled or disabled via configuration by a user such that a robot that operates in a not relatively flat environment, or a robot that can move in the vertical dimension, can bypass the slope tests. The process proceeds from the decision block 1210 to a state 1212 when the result of the test is a pass or is bypassed. Otherwise, when the result of the test is a fail, the process proceeds from the decision block 1210 to the state 1204, so that the potentially unreliable landmark measurement is not used.

In the state 1212, at this point in the process, the landmark measurement has passed the reliability tests, and the process permits the use of the landmark measurement. This can be accomplished by providing the SLAM module with an indication that one or more landmarks has been observed. In one embodiment, the process permits the observed landmark data, such as the delta pose information, landmark identifier, and an associated timestamp, to pass from the Visual Front End 602, through the Pre-Filter module 622, and onto the SLAM module 604. It will be understood that the process can be repeated when more than one landmark has been detected such that an entire list of landmark measurements can be processed, and that the measurements not rejected by the Pre-Filtering process can be processed by the SLAM module. The process then ends and can be repeated again as the robot moves about and re-encounters landmarks.

SLAM Processing for Revisiting Landmarks

Figure 13A:
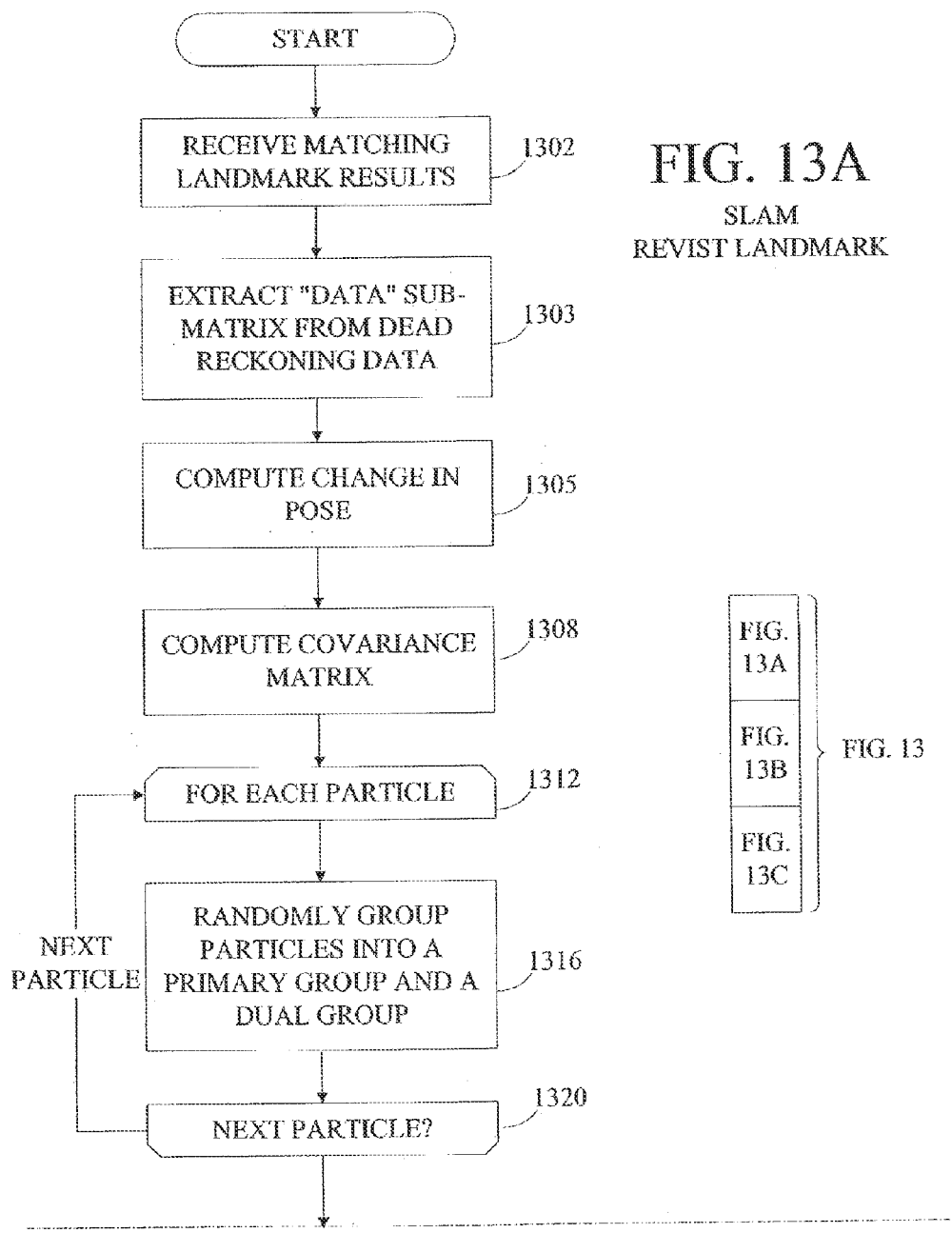
FIG. 13 consists of FIGS. 13A, 13B, and 13C and is a flowchart that generally illustrates a process useful in a SLAM module when re-encountering a landmark.
Figure 13C:
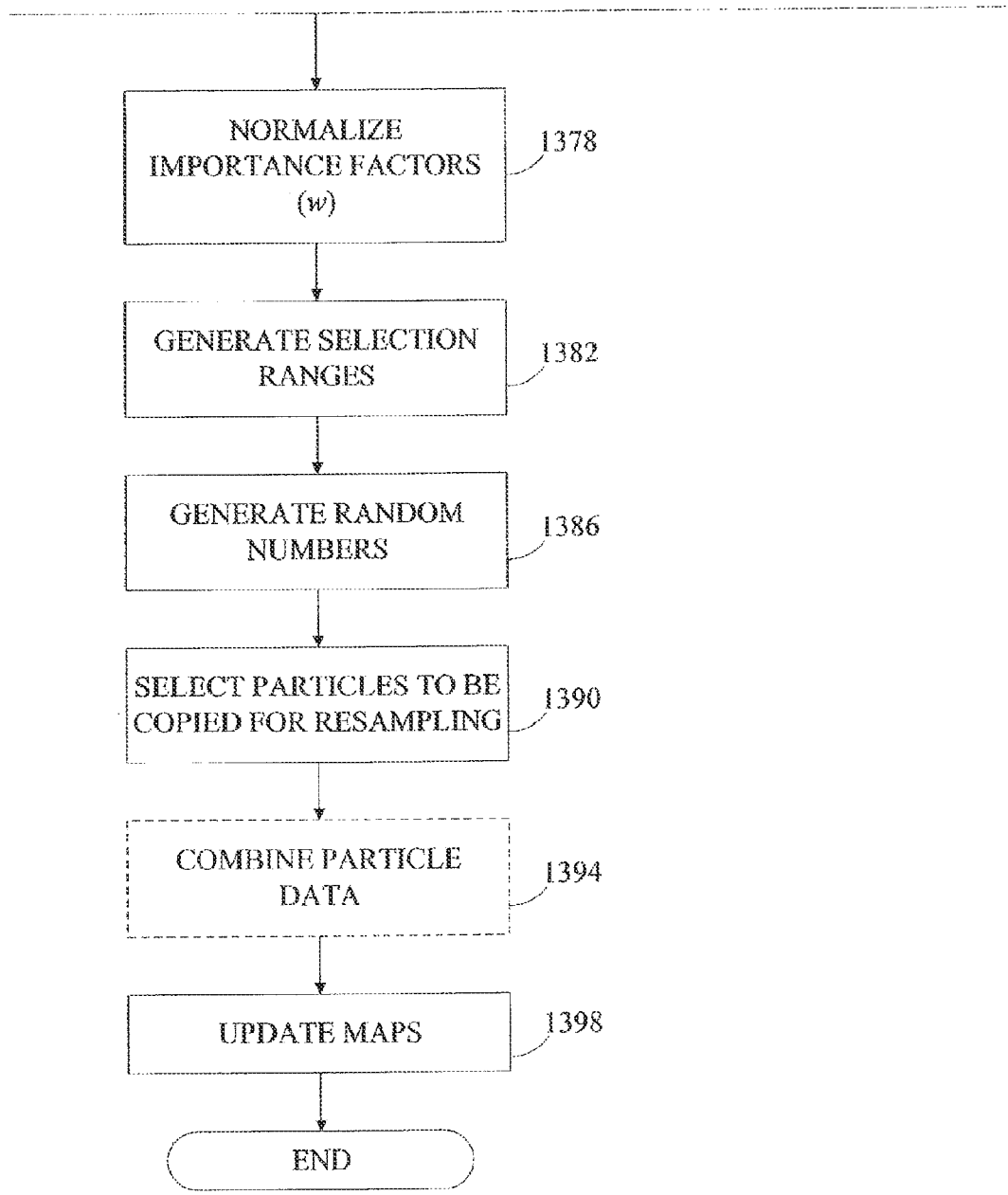

FIG. 13 is a flowchart that generally illustrates a process that can be used in a SLAM module when a landmark is re-encountered. The illustrated SLAM process advantageously updates one or more particles with information obtained from a combination of one or more visual sensors and one or more dead reckoning sensors. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. In addition, it should be noted that the process can be performed in a variety of ways, such as by software executing in a general-purpose computer, by firmware executed by a microprocessor, by dedicated hardware, and the like.

The process begins at a state 1302, where the process receives matching landmark data. The process can be used with or without a Pre-Filtering process, such as the process described earlier in connection with FIG. 12. For example, the SLAM process of FIG. 13 can receive unfiltered landmark measurement data from the state 920 of FIG. 9 or can receive filtered data from the state 1212 of FIG. 12. The process advances from the state 1302 to a state 1303.

In the state 1303, a sub-matrix is extracted from dead reckoning data, such as from the Dead Reckoning Data Matrix 812. In one embodiment, the sub-matrix, denoted D, corresponds to a 3×M matrix as illustrated in Equation 4.

$$D = \begin{pmatrix} x_{old} & x_1 & \ldots & x_{M-2} & x_{new} \\ y_{old} & y_1 & \ldots & y_{M-2} & y_{new} \\ \theta_{old} & \theta_1 & \ldots & \theta_{M-2} & \theta_{new} \end{pmatrix} \qquad \text{Equation 4}$$

In Equation 4, variables $x_{old}$, $y_{old}$, and $\theta_{old}$ correspond to a pose according to dead reckoning data from about the time of the last update for the particles $t_{old}$. Variables $x_{new}$, $y_{new}$, and $\theta_{new}$ correspond to a pose according to dead reckoning data at about the time $t_{new}$ that the landmark was re-encountered. Variables in columns 2 through M−1, i.e., $x_1$, $y_1$, and $\theta_1$ and $x_{M-2}$, $y_{M-2}$, and $\theta_{M-2}$ (and values in-between as applicable), correspond to data retrieved from the Dead Reckoning Data Matrix 812 at times between $t_{old}$ and $t_{new}$. In one embodiment, if no data point for the dead reckoning data is available at about times $t_{old}$ and/or $t_{new}$, the variables $x_{old}$, $y_{old}$, and $\theta_{old}$ and $x_{new}$, $y_{new}$, and $\theta_{new}$ can be interpolated from surrounding data. The process advances from the state 1303 to a state 1305.

In the state 1305, the process computes the change in pose traveled from a last update time for the SLAM system. In one embodiment, all the particles of a SLAM system are updated at the same time such that the last update time for a particular particle is the same as the last update time for the other particles. An example of change in pose computations were described earlier in connection with the state 1104 of FIG. 11. The process advances from the state 1305 to a state 1308.

In the state 1308, the covariance for dead reckoning data is computed. The dead reckoning covariance estimates errors in the dead reckoning data. It will be understood that the dead reckoning covariance can be computed by a variety of techniques, and that the computation can vary depending on the type of dead reckoning sensor used. In one embodiment, where the dead reckoning sensor is an odometer, the covariance is computed as follows and will be denoted "odometer covariance," and denoted $C_{odom}(D)$ and corresponds to a 3×3 matrix. While illustrated generally in the context of odometry, it will be understood by the skilled practitioner that the principles and advantages described herein will be applicable to other forms of dead reckoning sensors such that in another embodiment, the odometry covariance $C_{odom}(D)$ can correspond to a dead reckoning covariance $C_{dr}$.

The error noise modeled with the odometer covariance $C_{odom}(D)$ models the additional incremental noise in the dead reckoning from a pose A to another pose B for the values in the data sub-matrix D. In one embodiment, the odometer covariance $C_{odom}(D)$ corresponds to the final value of a matrix $C_{temp}$, that is, starts front an initial condition and is iteratively calculated between columns of the data sub-matrix D, for example, iteratively computed M−1 times. The value of the matrix $C_{temp}$ is initialized to a random noise covariance matrix $C_{RN}$ as expressed in Equation 5.

$$C_{temp} = C_{RN} \qquad \text{Equation 5}$$

In one embodiment, the random noise covariance matrix $C_{RN}$ corresponds to a diagonal matrix diag(2.8 cm², 2.8 cm², 0.0001 rad²). It will be understood that appropriate values for the random noise covariance matrix $C_{RN}$ can vary according to the characteristics of the dead reckoning sensor used. Other appropriate values for the random noise covariance matrix $C_{RN}$ will be readily apparent to one of ordinary skill of the art.

The process then enters a loop that executes M−1 times. In the illustrated example, a loop variable i starts from 2 and ends at M, and corresponds to a column in the data sub-matrix D. For each pass through the loop, the process computes Equation 6 to Equation 11. In one embodiment, the loop variable i increments after a pass through the loop, that is, after computing Equation 11 and before returning to Equation 6.

$$d_{AB} = \sqrt{(D_{1,i} - D_{1,i-1})^2 + (D_{2,i} - D_{2,i-1})^2} \qquad \text{Equation 6}$$

$$\phi_h = D_{3,i-1} - D_{3,1} \qquad \text{Equation 7}$$

$$\phi_r = [(D_{3,i} - D_{3,i-1} + \pi) \bmod 2\pi] - \pi \qquad \text{Equation 8}$$

$$\varphi = \phi_h + \frac{\phi_r}{2} \qquad \text{Equation 9}$$

$$G = \begin{bmatrix} \cos\varphi & -(d_{AB}\sin\varphi)/2 \\ \sin\varphi & (d_{AB}\cos\varphi)/2 \\ 0 & 1 \end{bmatrix} \qquad \text{Equation 10}$$

$$C_{temp} = C_{temp} + d_{AB}^2 G \begin{bmatrix} d_s^2 & 0 \\ 0 & r_s^2 \end{bmatrix} G^T \qquad \text{Equation 11}$$

It will also be understood that the subscripts for data sub-matrix D indicate a value taken from the row and column specified by the subscript, with the row appearing first in the subscript. Equation 6 computes the Euclidean distance $d_{AB}$ traveled from a point A to a point B as obtained from the data sub-matrix D. Equation 7 computes a relative heading $\phi_h$ from a point A to a point B. Equation 8 computes a change in orientation $\phi_r$. Equation 9 computes an average heading $\phi$ from a point A to a point B. Equation 10 computes a matrix G, which is used to transform a column vector with error information in translational error and rotational error into another column vector with error information in x error, y error, and orientation (θ) error. Equation 11 represents an update formula for the dead reckoning covariance from a point A to a point B, in which a previous value of the matrix $C_{temp}$ is used. It will be understood that the superscript "T" for the matrix $G^T$ indicates the transpose of the matrix G. In Equation 11, $d_s$ corresponds to the standard deviation of translation error per unit of traveled distance, and $r_s$ corresponds to the standard deviation of rotation error per unit of traveled distance. In one embodiment, $d_s$ and $r_s$ correspond to parameters with values of 0.05 and 0.0001, respectively. Other appropriate values will be readily determined by one of ordinary skill in the art. In addition, it will be understood by the skilled practitioner that the mathematical formulae expressed in Equation 6 to Equation 11 can be expressed in many alternative expressions such as by combining equations and changing variable names. The process then increments the value for the loop variable and returns to Equation 6. When the processing of the columns of the data submatrix D is complete, the final value of a matrix $C_{temp}$ is used as the odometer covariance $C_{odom}(D)$ and applied to one or more particles.

In the loop that includes the beginning of the loop 1312, a state 1316, and the end of the loop 1320, the process associates a particle with either a first group or a second group. A particle belonging to the first group is termed "primary particle" herein. A particle belonging to the second group is termed a "dual particle" herein. The rate of probability at which particles are allocated to the first group is termed "primary rate" herein. It will be understood that the primary rate can vary in a very broad range. An appropriate value for the primary rate can depend on the relative reliability of dead reckoning measurements over relatively short distances. For example, where dead reckoning measurements are relatively unreliable, relatively lower values for the primary rate are used. In one embodiment, the primary rate is about 0.9 such that about 90% of the particles are grouped as primary particles and about 10% of the particles are grouped as dual particles. In one embodiment, two different particles in the multiple hypotheses have about the same probability of being associated with the first group (e.g., a probability of 0.1) or with the second group (e.g., a probability of 0.9), and such association is performed in an approximately random manner. Upon completion of the loop, the process proceeds to the beginning of a loop 1324.

The beginning of the loop 1324 starts at a state 1326. In the state 1326, the process predicts or estimates a new robot pose for the m-th particle $S_{m,pred}$ from the previous robot pose for the m-th particle $s_m$ $(x_{m,old}, y_{m,old}, \theta_{m,old})^T$ by retrieving the change in pose $[\Delta_1^{odom}, \Delta_2^{odom}, \Delta_3^{odom}]^T$ obtained via dead reckoning data as described earlier in connection with the state 1305 of FIG. 13 and Equation 1, and combining the change in pose $[\Delta_1^{odom}, \Delta_2^{odom}, \Delta_3^{odom}]^T$ with the previous pose $s_m$ $(x_{m,old}, y_{m,old}, \theta_{m,old})^T$ using the process described in the state 1110 of FIG. 11 and in Equation 2, where $(x_k, y_k, \theta_k)=(x_{m,old}, y_{m,old}, \theta_{m,old})$, and the new robot pose $S_{m,pred}$ corresponds to $(x_l, y_l, \theta_l)^T=(x_{m,pred}, y_{m,pred}, \theta_{m,pred})^T$. The process advances from the state 1326 to a decision block 1328.

In the decision block 1328, the process Selects a primary processing path 1332 or a dual processing path 1336. The primary processing path 1332 includes a state 1344, a state 1348, and a state 1352. The dual processing path 1336 includes a state 1360, a state 1364, and a state 1372.

In the state 1344, the process retrieves the predicted pose calculated in the state 1326 and perturbs the predicted pose. In one embodiment, the process adds simulated Gaussian random noise $(\epsilon_{x,m}, \epsilon_{y,m}, \epsilon_{\theta,m})^T$ to the predicted pose $S_{m,pred}$ $(x_{m,pred}, y_{m,pred}, \theta_{m,pred})^T=(S_{m,pred}(1), S_{m,pred}(2), S_{m,pred}(3))^T$ to produce the perturbed predicted pose $\tilde{S}_{m,pred}$. In one embodiment, the simulated Gaussian random noise $(\epsilon_{x,m}, \epsilon_{y,m}, \epsilon_{\theta,m})^T$ is sampled from a Gaussian distribution with mean $(0, 0, 0)^T$ and covariance $C_{odom}$.

$$\tilde{S}_{m,pred} = \begin{pmatrix} S_{m,pred}(1) + \epsilon_{x,m} \\ S_{m,pred}(2) + \epsilon_{y,m} \\ [(S_{m,pred}(3) + \epsilon_{\theta,m} + \pi) \bmod 2\pi] - \pi \end{pmatrix} \quad \text{Equation 12}$$

Equation 12 expresses a calculation for the perturbed predicted pose. The process advances from the state 1344 to the state 1348.

In the state 1348, the process predicts or estimates the landmark pose $L_{m,meas}^k$ from the perturbed predicted pose $\tilde{S}_{m,pred}$ and from the visual measurements obtained from the visual localization module and/or the Pre-Filter module. Later, this predicted or estimated landmark pose $L_{m,meas}^k$ will be compared to a current landmark pose estimate $L_m^k$ from the current map of the landmark associated with the particle. Equation 14 expresses one formula that can be used to predict the predicted landmark pose $L_{m,meas}^k$. The process advances from the state 1348 to the state 1352.

$$\Delta^{vis} = \begin{bmatrix} \Delta_1^{vis} \\ \Delta_2^{vis} \\ \Delta_3^{vis} \end{bmatrix} = \begin{bmatrix} \sqrt{(\Delta x)^2 + (\Delta y)^2} \\ \arctan(\Delta y/\Delta x) \\ \Delta\theta \end{bmatrix} \quad \text{Equation 13}$$

$$L_{m,meas}^k = \begin{bmatrix} \tilde{S}_{m,pred}(1) + \Delta_1^{vis}\cos(\tilde{S}_{m,pred}(3) + \Delta_2^{vis}) \\ \tilde{S}_{m,pred}(2) + \Delta_1^{vis}\sin(\tilde{S}_{m,pred}(3) + \Delta_2^{vis}) \\ [(\tilde{S}_{m,pred}(3) + \Delta_3^{vis} + \pi) \bmod 2\pi] - \pi \end{bmatrix} \quad \text{Equation 14}$$

In the state 1352, the process computes an importance factor $w_m$ for the primary processing path 1332. The importance factor $w_m$ can be computed by application of Equation 15 to Equation 18.

$$C = C_{sensor} + C_m^k \quad \text{Equation 15}$$

$$\Delta = \begin{pmatrix} \Delta_1 \\ \Delta_2 \\ \Delta_3 \end{pmatrix} = L_{m,meas}^k - L_m^k \quad \text{Equation 16}$$

$$\Delta_3 = [(\Delta_3 + \pi)\bmod 2\pi] - \pi \quad \text{Equation 17}$$

$$w_m = \frac{1}{2\pi\sqrt{\det C}}\exp\left(-\frac{1}{2}\Delta^T C^{-1}\Delta\right) \quad \text{Equation 18}$$

In Equation 15, the sensor covariance matrix $C_{sensor}$ corresponds to a 3×3 matrix. In one embodiment, the sensor covariance matrix $C_{sensor}$ corresponds to a diagonal matrix diag(81 cm$^2$, 81 cm$^2$, 0.019 rad$^2$). Other representative values for the elements of the covariance matrix will be readily determined by one of ordinary skill in the art. For example, these appropriate values for the elements of the sensor covariance matrix $C_{sensor}$ can vary with camera resolution, average distance to 3-D features, and the like. In Equation 18, the "exp" indicates exponentiation with a base of "e"; i.e., the base of natural logarithms. In one embodiment, the importance factor $w_m$ is identifiably stored for the particle and is later used to estimate the probability for the particle. The process proceeds from the state 1352 to the end of the loop 1356. The process repeats the loop by returning from the end of the loop 1356 to the beginning of the loop 1324 to process other particles. Otherwise, the process proceeds to a state 1378.

Returning now to the decision block 1328, processing of particles that are "dual" will now be described. The dual processing path 1336 starts at the state 1360.

In the state 1360, a hypothetical robot pose based on the current (last updated) pose estimate of the landmark, denoted $L_m^k$, and the acquired measurement of the landmark from the visual localization module and/or the Pre-Filter module, denoted $\Delta x$, $\Delta y$, and $\Delta\theta$ is computed. This produces a visually-estimated robot pose termed a "measured pose" $S_{m,meas}$, as illustrated in Equation 19.

$$S_{m,meas} = \begin{bmatrix} L_m^k(1) - \Delta_1^{vis}\cos(L_m^k(3) - \Delta_2^{vis}) \\ L_m^k(2) - \Delta_1^{vis}\sin(L_m^k(3) - \Delta_2^{vis}) \\ [(L_m^k(3) - \Delta_3^{vis} + \pi)\mod 2\pi] - \pi \end{bmatrix} \quad \text{Equation 19}$$

In the state 1364, the measured pose $S_{m,meas}$ is perturbed with random noise $(\epsilon_{x,m}, \epsilon_{y,m}, \epsilon_{\theta,m})^T$ to generate a perturbed measured pose $\tilde{S}_{m,meas}$. In one embodiment, the random noise $(\epsilon_{x,m}, \epsilon_{y,m}, \epsilon_{\theta,m})^T$ is sampled from a Gaussian distribution with mean $(0, 0, 0)^T$ and sensor covariance $C_{sensor}$. Equation 20 expresses a formula which can be used to calculate the perturbed measured pose $\tilde{S}_{m,meas}$.

$$\tilde{S}_{m,meas} = \begin{pmatrix} S_{m,meas}(1) + \varepsilon_{x,m} \\ S_{m,meas}(2) + \varepsilon_{y,m} \\ [(S_{m,meas}(3) + \varepsilon_{\theta,m} + \pi)\mod 2\pi] - \pi \end{pmatrix} \quad \text{Equation 20}$$

The process advances from the state 1364 to the state 1372. In the state 1372, the process computes an importance factor $w_m$ for the dual processing path 1336 by computing Equation 21, Equation 22, Equation 23, and Equation 24. Equation 24 corresponds to an expression for the computation of the importance factor $w_m$ for a dual particle. A scale factor of $1/f$, such as $1/5$, is applied in the computation of Equation 24 to account for real-life visual measurements, which may exhibit actual noise characteristics that differ from than that of Gaussian noise.

$$C = C_k^m + C_{odom} \quad \text{Equation 21}$$

$$\Delta = \begin{pmatrix} \Delta_1 \\ \Delta_2 \\ \Delta_3 \end{pmatrix} = \tilde{S}_{m,meas} - S_{m,pred} \quad \text{Equation 22}$$

$$\Delta_3 = [(\Delta_3 + \pi)\mod 2\pi] - \pi \quad \text{Equation 23}$$

$$w_m = \left(\frac{1}{f}\right)\frac{1}{2\pi\sqrt{\det C}}\exp\left(-\frac{1}{2}\Delta^T C^{-1}\Delta\right) \quad \text{Equation 24}$$

The process then advances from the state 1372 to the end of the loop 1356. The loop repeats until the processing of the particles is complete. When processing of the particles is complete, the process advances to the state 1378. In the illustrated process, the state 1378, a state 1382, a state 1386, and a state 1390 correspond to a sub-process for resampling particles in a probabilistic manner. Table 1 and Table 2 illustrate an example of resampling particles. In the illustrated sub-process, particles that have a relatively high importance factor are more likely to be retained than particles that have a relatively low importance factor.

TABLE 1

| "Old" Particle Number (i) | Importance Factor (w) (ii) | Normalized w (iii) | Range (iv) |
|---|---|---|---|
| 1 | 0.99 | 0.430 | 0-0.430 |
| 2 | 0.29 | 0.126 | 0.430-0.556 |
| 3 | 0.48 | 0.209 | 0.556-0.765 |
| 4 | 0.31 | 0.135 | 0.765-0.900 |
| 5 | 0.23 | 0.100 | 0.900-1 |

In the state 1378, at this point in the process, the robot poses for the particles have been updated. In the state 1378, the process normalizes the importance factors (w) associated with the particles. For example, the importance factors (w) for K particles can be summed, and then each of the importance factors can be divided by the sum to normalize the importance factors. By way of example, Table 1 illustrates normalizing for a 5-particle multiple hypothesis system. The "old" particle numbers are listed in column (i) of Table 1. Sample values for the importance factor (w) for each particle are listed in column (ii). The sum of the sample values in column (ii) is 2.30, which is applied as a divisor to the importance factor values in column (ii) to generate the normalized importance factor values illustrated in column (iii). The process advances from the state 1378 to the state 1382.

In the state 1382, the process generates selection ranges for the particles. Returning to the example of Table 1, the process allocates a range within 0 to 1 according to the value of the normalized importance factor. An example of a selection range for a particle based on the normalized importance factor values is illustrated in column (iv) of Table 1. Accordingly, particles associated with relatively large values of normalized importance factors have a correspondingly relatively large selection range. The process advances from the state 1382 to the state 1386.

In the state 1386, the process generates random numbers. These random numbers are used to select which of the old particles are copied and which of the old particles are rejected. Column (v) in Table 2 represents "new" particle numbers. Column (vi) illustrates randomly generated numbers in the range of 0 to 1. It will be understood that the range for the randomly generated numbers illustrated in Column (vi) of Table 2 should correspond to the same range as the selection range for the particles, an example of which was described earlier in connection with column (iv) of Table 1. The process advances from the state 1386 to the state 1390.

TABLE 2

| "New" Particle Number (v) | Randomly Generated Number (vi) | "Old" Particle Copied (vii) |
|---|---|---|
| 1 | 0.01 | 1 |
| 2 | 0.08 | 1 |
| 3 | 0.54 | 2 |
| 4 | 0.64 | 3 |
| 5 | 0.84 | 4 |

In the state 1390, the process uses the randomly selected numbers for the "new" particles illustrated in column (vi) of Table 2 and the selection ranges for the "old" particles illustrated in column (iv) of Table 1 to select which particles are to be retained from the "old" collection of particles. The result of the resampling is illustrated in column (vii) of Table 2. In the example illustrated by Table 1 and by Table 2, the "old" particle 1 is copied twice to the new collection, "old" particles 2, 3, and 4 are each copied once to the collection, and "old" particle 5 is dropped from the collection.

In one embodiment, when an existing particle is copied, the history of the particle is also copied. For example, the records of a first particle with a first Hypothesis ID can be copied to the records of a second particle with a second Hypothesis ID. Examples of fields for these records were described in greater detail earlier in connection with the Multiple Hypothesis Table 814 and the Map Table 816 of FIG. 8.

The robot pose for the m-th particle can updated by using the time that the landmark was re-observed as a timestamp for the "last observed time" or $t_{new}$ and using the predicted particle pose $S_{m,pred}$ as the new pose data. This can be expressed in Equation 25.

$$s_m = [t_{new}, S_{m,meas}{}^T]^T \qquad \text{Equation 25}$$

The process can proceed from the state 1390 to an optional state 1394. In the optional state 1394, the process combines the multiple particle data for applications in which a single pose estimate is desired. It will be understood that the pose from the particles can be combined in many ways. In one embodiment, the location and heading are computed according to an average of the poses, as expressed in Equation 26, Equation 27, and Equation 28, where $s_m = (t, x_m, y_m, \theta_m)$.

$$\bar{x} = \frac{1}{K} \sum_{m=1}^{K} s_m(2) \qquad \text{Equation 26}$$

$$\bar{y} = \frac{1}{K} \sum_{m=1}^{K} s_m(3) \qquad \text{Equation 27}$$

$$\bar{\theta} = \arctan\left( \frac{\sum_{m=1}^{K} \sin(s_m(4))}{\sum_{m=1}^{K} \cos(s_m(4))} \right) \qquad \text{Equation 28}$$

A composite pose $\bar{S}$ can be provided by the SLAM process and can be expressed by $\bar{S} = (\bar{x}, \bar{y}, \bar{\theta})^T$. This composite pose $\bar{S}$ can be provided as an input to, for example, a robot behavior control program such as a behavioral program for vacuum cleaning. In alternative examples of computing a composite pose $\bar{S}$, the composite pose can be weighted using probabilities and/or importance factors, can be averaged by selecting data only from high probability particles, and the like. The process advances from the optional state 1394 to a state 1398.

At this point in the illustrated process, the robot poses for the particles have been updated and processed. In the state 1398, the process updates the maps for the particles by updating the landmark pose estimate $L_m^k$ for the observed landmark of a particle with a statistical filter. It will be understood that the state 1398 can include a loop to update the maps of each of the particles.

In one embodiment, a Kalman filter is used to update the landmark pose estimate $L_m^k$. The Kalman filter is an example of an efficient implementation of a least-squares filter. The use of a Kalman filter advantageously permits updates to the map to be made in real time without repeated iterations between measurements. A landmark pose and the relative visual localization data $(\Delta_1^{vis}, \Delta_2^{vis}, \Delta_3^{vis})^T$ are used to generate the measured landmark pose $\hat{L}_m^k$ in the Kalman filter as illustrated in Equation 29.

$$\hat{L}_m^k = \begin{bmatrix} s_m(2) + \Delta_1^{vis}\cos(s_m(4) + \Delta_2^{vis}) \\ s_m(3) + \Delta_1^{vis}\sin(s_m(4) + \Delta_2^{vis}) \\ [(s_m(4) + \Delta_3^{vis} + \pi)\mod 2\pi] - \pi \end{bmatrix} \qquad \text{Equation 29}$$

The measured landmark pose $\hat{L}_m^k$ is used in the Kalman filter to efficiently update or correct the landmark pose estimate $L_m^k$. The covariance matrix of the process noise is denoted by Q, and the covariance matrix of the measurement noise is denoted by R. In one embodiment, an appropriate value for the covariance matrix of the process noise Q is the constant matrix diag(2.8 cm$^2$, 2.8 cm$^2$, 0.0001 rad$^2$). Other appropriate values for the covariance matrix of the process noise Q will be readily determined by one of ordinary skill in the art. In one embodiment, an appropriate value for the covariance matrix of the measurement noise R is the constant matrix diag(81 cm$^2$, 81 cm$^2$, 0.0019 rad$^2$). Other appropriate values for the measurement noise R will be readily apparent to one of ordinary skill in the art. It should be noted that an appropriate value for the measurement noise R can vary depending on factors such as the resolution of the visual sensor, the average distance to features, and the like. The covariance matrix of the state vector estimate $C_m^k$ is also updated in the Kalman filter. The process then ends and can be repeated on an ongoing basis as new landmarks are re-encountered.

Example of System Architecture for the Visual Front End 602

Figure 14:
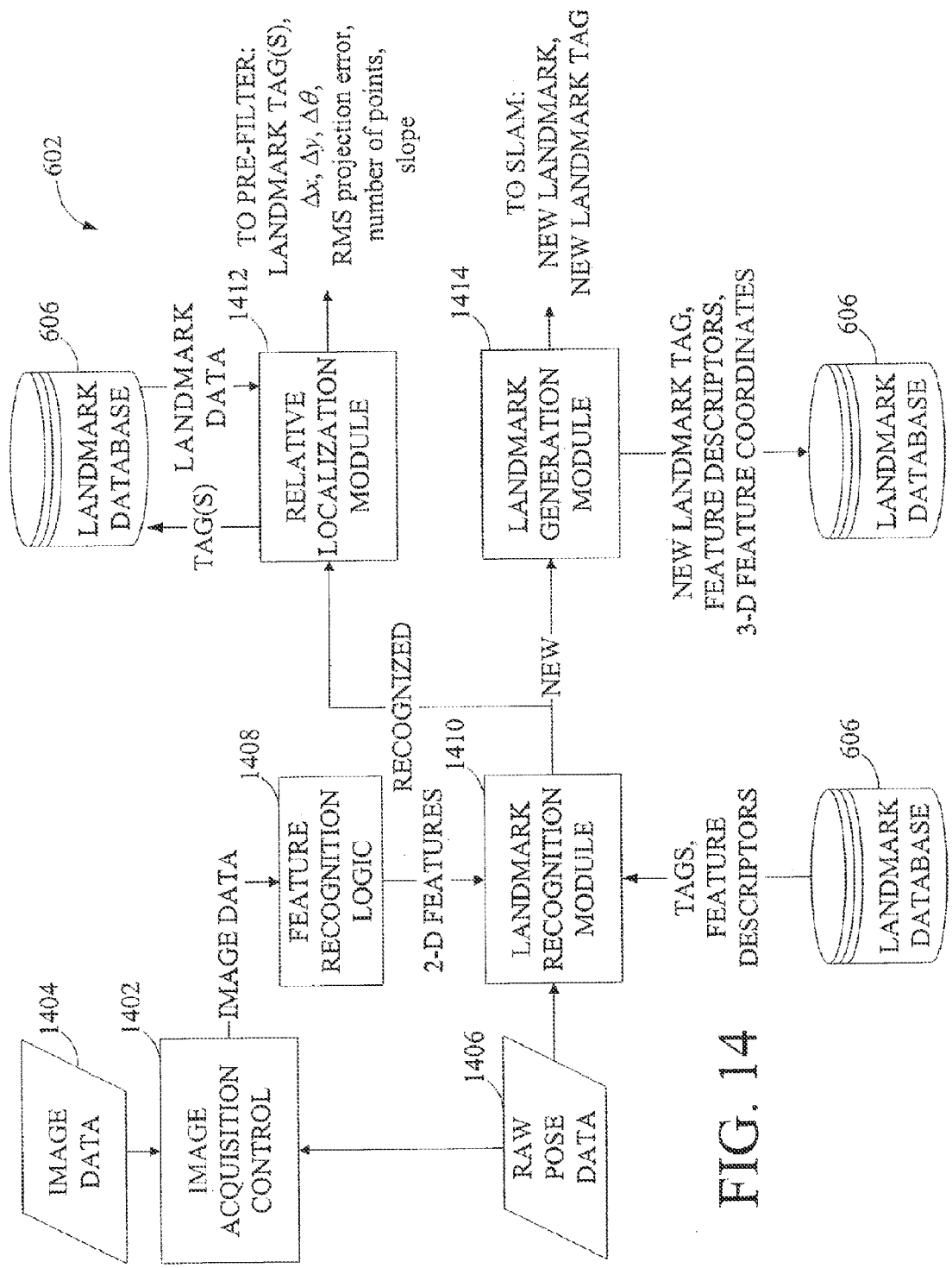
FIG. 14 illustrates one embodiment of a system architecture for visual localization.

FIG. 14 illustrates one embodiment of a system architecture for the Visual Front End 602. The illustrated system architecture for the Visual Front End 602 can advantageously be implemented with dedicated hardware, with firmware, with software, and with various combinations of the same. For clarity, relatively minor details such as timestamps, calibration data, and selected database identifiers are not drawn in FIG. 14.

The illustrated Visual Front End 602 includes an image acquisition control module 1402. The image acquisition control module 1402 receives image data 1404 as an input. The image data 1404 can be provided by a visual sensor, such as a camera. The visual sensor can correspond to a single-camera device or to a multiple-camera device. The images acquired can be used to locate the robot within a global reference frame or can be used to add landmarks to the landmark database 606. Where a single camera is used, and the robot moves to obtain images with varying perspectives for landmark creation, the image acquisition control module 1402 can also receive raw pose data 1406 from a dead reckoning device, such as from odometry. For example, the image acquisition control module 1402 can select images for landmark creation that are taken at appropriately-spaced baseline intervals. In one embodiment, the image acquisition control module 1402 advantageously receives the image data 1404 and/or the raw pose data 1406 via interaction with a hardware abstraction layer (HAL). See commonly-owned U.S. patent application entitled "SENSOR AND ACTUATOR ABSTRACTION AND AGGREGATION IN A HARDWARE ABSTRACTION LAYER FOR A ROBOT" filed on Nov. 27, 2002, with application Ser. No. 10/307,199, the entirety of which is hereby incorporated by reference herein.

The image acquisition control module 1402 provides image data as an input to feature recognition logic 1408. The feature recognition logic 1408 can identify feature descriptors, such as SIFT feature vectors, that are present in the image. The feature descriptors identified are provided as an input to a landmark recognition module 1410. The landmark recognition module 1410 uses the feature descriptors identified in the image to identify landmarks with similar features that have been previously identified and stored in a database, such as the landmark database 606. In one embodiment, the landmark recognition module 1410 can identify one or more matching landmarks based on the number of features that are common between the image and the stored landmark, and the landmark recognition module 1410 can provide a relative localization module 1412 with a list of matching landmarks and corresponding 2-D features. When no matching landmark is provided by the landmark recognition module 1410, a landmark generation module 1414 can determine whether to add a new landmark to the landmark database 606 based on the features observed in the image. In one embodiment, the relative localization module 1412 and the landmark generation module 1414 operate independently in parallel such that a landmark can be added to the database while another landmark is matched.

In one embodiment, the relative localization module 1412 receives an indication of which features matched in the one or more matching landmarks, and an indication of the approximate 2-D location of the features in the image. For example, the indication of the approximate 2-D location can correspond to a pixel location. The relative localization module 1412 extracts 3-D position information and 2-D image location information for the features of the matching landmark from the landmark database 606, and can use projection to calculate the robot's pose for the image data 1404 relative to the robot's pose when the landmark was created. The relative localization module 1412 provides the relative pose(s) to the one or more identified landmarks as an output of the Visual Front End 602. The relative pose(s) can be provided as an input to, for example, the Pre-Filter module 622 or to the SLAM module 604.

The landmark generation module 1414 receives groups of image data, and determines whether to add a landmark to the landmark database 606. The landmark generation module 1414 uses groups of image data rather than a single image so that the 3-D coordinates of a feature can be determined. When enough features of sufficient reliability have been identified, the landmark generation module 1414 can add the landmark to the landmark database 606. In the illustrated example, the coordinates of the 3-D features and, optionally, the 2-D coordinates of the corresponding 2-D features and their associated feature descriptors are stored in the landmark database 606. An indication that a new landmark has been created can be provided as an output of the Visual Front End 602 and provided as an input to the SLAM module 604. It will be understood that database record identifiers can also be passed between various modules for bookkeeping purposes.

Example of a System Architecture for the Pre-Filter Module 622

Figure 15:
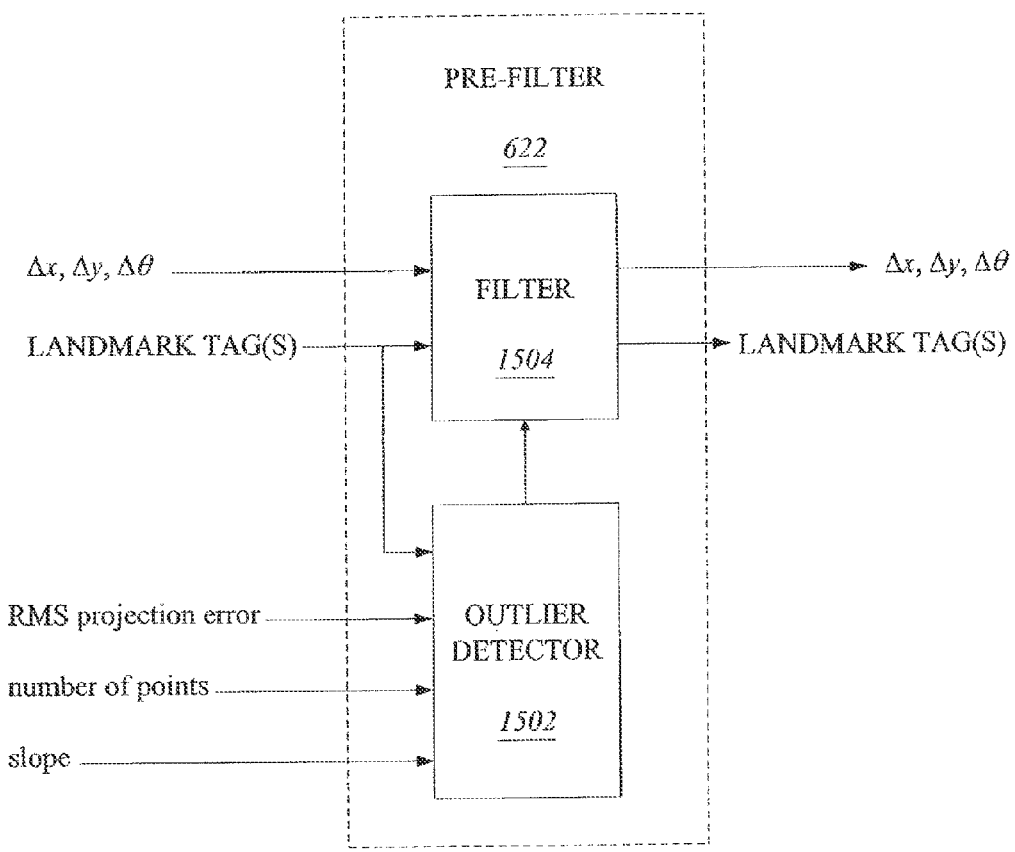
FIG. 15 illustrates an embodiment of a pre-filter for filtering outliers.

FIG. 15 illustrates an embodiment of the Pre-Filter module 622 for filtering outliers. The illustrated system architecture for the Pre-Filter module 622 can advantageously be implemented with dedicated hardware, with firmware, with software, and with various combinations of the same.

The Pre-Filter module 622 receives one or more indications of matching landmarks as an input and filters the matching landmarks such that none, a portion, or all of the matching landmarks are provided as an output. By filtering the measurements of matching landmarks according to predefined criteria such that outliers are not relied upon by the SLAM module 604 for localization, the Pre-Filter module 622 advantageously enhances the robustness and accuracy of the VSLAM system 600.

The illustrated Pre-Filter module 622 includes an outlier detector module 1502 and a filter module 1504. In one embodiment, the data shown in FIG. 15 as provided to the Pre-Filter module 622 is accessed from a shared memory by the pre-filter module. The outlier detector module 1502 evaluates one or more criteria for evaluating the reliability or trustworthiness of an observed landmark measurement. For example, one or more of the RMS projection error, the number of matching features, and the slope can be compared to predetermined thresholds as described earlier in connection with FIG. 12. One or more landmark tags or identifiers can also be provided as an input to the outlier detector module 1502 such that the outlier detector module 1502 can identify which of the identified landmarks have passed the tests for reliability. An indication of the pass or fail status of one or more landmark measurements is provided by the outlier detector module 1502 as an input to the filter module 1504.

At least partly in response to the pass or fail status of the landmark measurements, the filter module 1504 permits the passage of the data from the Visual Front End 602 to the SLAM module 604. In one embodiment, the filtering is implemented by setting status flags that are read by the SLAM module 604 to determine whether or not to use a particular landmark.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method for localizing a mobile device in a visual simultaneous localization and mapping system, the method comprising:

visually observing an environment via a camera of the mobile device;

maintaining a map of landmarks in a data store on the mobile device based at least in part on visual observations of the environment obtained from the camera of the mobile device using a processing system on the mobile device;

receiving an indication that a landmark has been recognized and estimating a visually-measured relative pose to the landmark, wherein the relative pose reveals a change in pose from (i) the pose when the landmark was created and stored in the data store to (ii) the pose when the physical landmark was re-observed;

receiving data from at least one dead reckoning sensor of the mobile device at the processing system on the mobile device and storing the data, wherein the data from the dead reckoning sensor relates to movement of the mobile device within the environment;

using data from the dead reckoning sensor to estimate a change in pose;

determining a current device pose estimate based upon the relative pose and the data from the dead reckoning sensor, wherein visual observations of landmarks obtained from the camera sensor compensates for drift in the dead reckoning sensors, wherein determining a current device pose further comprises using the change in pose estimated from the data from the dead reckoning sensor and using a relative pose to calculate the current device pose estimate.

2. The method of claim 1, wherein the at least one dead reckoning sensor is an optical sensor that obtains data related to the movement of the apparatus within the environment.

3. The method of claim 2, wherein the optical sensor is at least one optical mouse device.

4. The method of claim 2, further comprising receiving dead reckoning data from an optical wheel encoder.

5. The method of claim 1, wherein the camera is a forward-looking camera.

6. The method of claim 1, wherein the camera is positioned at a particular position selected from the group consisting of (1) an upward-pointing camera, (2) a sideways-looking camera, (3) a position between forward looking, upward, and sideways.

7. The method of claim 1, wherein the camera comprises a lens selected from the group consisting of a normal lens, a wide-angle lens, and an omni-directional lens.

8. The method of claim 1, wherein the dead reckoning sensor corresponds to at least one sensor selected from the group consisting of an odometer, a pedometer, a GPS sensor, and an inertial sensor.

9. The method of claim 1, wherein the map comprises one or more maps.

10. The method of claim 1, further comprising creating new landmarks within the map of landmarks from images captured by the visual sensor using the processing system of the mobile device, wherein a landmark is associated with a device pose comprising a position and orientation of the mobile device that is determined when the landmark is created or updated when re-observed.

11. The method of claim 1, wherein the dead reckoning data measures an estimated distance traveled from a prior pose estimate.

12. The method of claim 1, wherein the dead reckoning data is at least one measurement selected from the group consisting of a distance traveled, a velocity, and an acceleration.

13. The method of claim 1, wherein a portion of the data processing for autonomously navigating the mobile device using one or more maps are performed by an electronic device that communicates with the mobile device via a network.

14. An apparatus for autonomous localization and mapping, the apparatus comprising:

a camera configured to visually observe an environment;
a processor configured to execute computer instructions;
a tangible, non-transitory computer readable medium configured to store a computer program, wherein the computer program directs the processor to:
maintain a map of landmarks in a data store based at least in part on visual observations of the environment obtained from the camera;
receive an indication that a landmark has been recognized and estimating a visually-measured relative pose to the landmark, wherein the relative pose reveals a change in pose from (i) the pose when the landmark was created and stored in the data store to (ii) the pose when the physical landmark was re-observed;
receive data from at least one dead reckoning sensor and storing the data, wherein the data from the dead reckoning sensor relates to movement of the camera within the environment;
using data from the dead reckoning sensor to estimate a change in pose; and
determine a current device pose estimate based upon the relative pose and the data from the dead reckoning sensor, wherein visual observations of landmarks obtained from the camera compensates for drift in the dead reckoning sensors, wherein determining a current device pose further comprises using the change in pose estimated from the data from the dead reckoning sensor and using a relative pose to calculate the current device pose estimate.

15. The apparatus of claim 14, wherein the at least one dead reckoning sensor is an optical sensor that obtains data related to the movement of the apparatus within the environment.

16. The apparatus of claim 15, wherein the optical sensor is at least one optical mouse device.

17. The apparatus of claim 15, further comprising receiving dead reckoning data from an optical wheel encoder.

18. The apparatus of claim 14, wherein the camera corresponds to at least one camera.

19. The method of claim 1, wherein the camera comprises a single camera.

20. The method of claim 1, wherein the robot comprises a vacuum cleaning robot, the method further comprising providing the current device pose estimate to a robot behavior control program for vacuum cleaning.

* * * * *